United States Patent
Zhu et al.

(10) Patent No.: US 7,936,664 B2
(45) Date of Patent: May 3, 2011

(54) MULTI-CARRIER RADIO LINK PROTOCOL SUPERVISION IN A RADIO COMMUNICATION SYSTEM

(75) Inventors: Yuan-Joshua Zhu, Beijing (CN); Adele Gao, Beijing (CN); Mark W. Cheng, San Diego, CA (US); Zhi-Chun Honkasalo, Kauniainen (FI)

(73) Assignee: Nokia Corporation, Espoo (FI)

( * ) Notice: Subject to any disclaimer, the term of this patent is extended or adjusted under 35 U.S.C. 154(b) by 973 days.

(21) Appl. No.: 11/400,838

(22) Filed: Apr. 7, 2006

(65) Prior Publication Data

US 2006/0187870 A1    Aug. 24, 2006

Related U.S. Application Data

(63) Continuation-in-part of application No. 09/610,749, filed on Jul. 6, 2000, now Pat. No. 7,046,642, which is a continuation of application No. 08/851,010, filed on May 5, 1997, now Pat. No. 6,088,342, and a continuation-in-part of application No. 10/285,899, filed on Oct. 31, 2002, now Pat. No. 7,298,701.

(51) Int. Cl.
| | |
|---|---|
| H04L 1/00 | (2006.01) |
| H04L 12/56 | (2006.01) |
| H04L 1/16 | (2006.01) |
| G08C 25/02 | (2006.01) |
| H04B 7/216 | (2006.01) |

(52) U.S. Cl. ........ 370/216; 370/320; 370/394; 714/748; 714/749

(58) Field of Classification Search ................... 370/320, 370/394, 216
See application file for complete search history.

(56) References Cited

U.S. PATENT DOCUMENTS

| | | | |
|---|---|---|---|
| 4,570,257 A | * | 2/1986 | Olson et al. .................. 370/216 |
| 4,617,657 A | | 10/1986 | Drynan et al. |
| 4,779,274 A | | 10/1988 | Takahashi et al. |

(Continued)

FOREIGN PATENT DOCUMENTS

CN    1099919    3/1995

(Continued)

OTHER PUBLICATIONS

Kim T. Chang; *Multi-link Multi-flow Packet Application*; Oct. 24, 2005; 103 pages.

(Continued)

*Primary Examiner* — Nick Corsaro
*Assistant Examiner* — Tangela T. Chambers
(74) *Attorney, Agent, or Firm* — Alston & Bird LLP

(57) ABSTRACT

A method is provided for facilitating efficient usage of radio capacity in a radio communication system including a communication station operable to receive, over a plurality of subchannels of the radio communication system. In this regard, the packet-formatted data has an overall sequence, and is divided into a plurality of portions receivable by the communication station over respective subchannels, where each portion has a respective link sequence. The method includes detecting missing packet-formatted data at the communication station based upon the overall sequence or at least one of the link sequences. Then, when the missing packet-formatted data is detected based upon the overall sequence, a time period is timed, and when the communication station fails to receive the missing packet-formatted data before the step of timing times out, retransmission of the missing packet-formatted data is requested.

24 Claims, 12 Drawing Sheets

U.S. PATENT DOCUMENTS

| | | | |
|---|---|---|---|
| 4,841,526 A | 6/1989 | Wilson et al. | |
| 4,970,714 A | 11/1990 | Chen et al. | |
| 4,989,204 A * | 1/1991 | Shimizu et al. | 370/349 |
| 5,036,518 A * | 7/1991 | Tseung | 370/432 |
| 5,210,751 A | 5/1993 | Onoe et al. | |
| 5,410,536 A * | 4/1995 | Shah et al. | 370/216 |
| 5,563,895 A * | 10/1996 | Malkamaki et al. | 714/748 |
| 5,570,367 A * | 10/1996 | Ayanoglu et al. | 370/349 |
| 5,708,656 A | 1/1998 | Noneman et al. | |
| 5,717,689 A | 2/1998 | Ayanoglu | |
| 5,751,708 A * | 5/1998 | Eng et al. | 370/394 |
| 5,784,362 A | 7/1998 | Turina | |
| 5,790,551 A | 8/1998 | Chan | |
| 5,793,744 A | 8/1998 | Kanerva et al. | |
| 5,930,233 A | 7/1999 | Kanerva et al. | |
| 5,931,964 A * | 8/1999 | Beming et al. | 370/442 |
| 5,956,329 A | 9/1999 | Pernice et al. | |
| 5,966,656 A * | 10/1999 | Elkin et al. | 455/229 |
| 6,031,818 A * | 2/2000 | Lo et al. | 370/216 |
| 6,122,504 A | 9/2000 | Niepel et al. | |
| 6,385,456 B2 | 5/2002 | Menzel | |
| 6,473,399 B1 | 10/2002 | Johansson et al. | |
| 6,522,635 B1 * | 2/2003 | Bedwell | 370/471 |
| 6,556,550 B1 | 4/2003 | Rasanen | |
| 6,563,789 B1 | 5/2003 | Rasanen | |
| 6,584,089 B1 | 6/2003 | Honkasalo et al. | |
| 6,597,675 B1 * | 7/2003 | Esmailzadeh et al. | 370/335 |
| 6,654,422 B1 | 11/2003 | Khan et al. | |
| 6,717,916 B1 | 4/2004 | Ahn et al. | |
| 6,721,303 B1 | 4/2004 | Menzel et al. | |
| 6,987,780 B2 | 1/2006 | Wei et al. | |
| 7,167,482 B1 | 1/2007 | Menzel et al. | |
| 2004/0009786 A1 | 1/2004 | Terry | |
| 2004/0085943 A1 | 5/2004 | Hsu et al. | |
| 2004/0116143 A1 | 6/2004 | Love et al. | |
| 2005/0105511 A1 | 5/2005 | Poikselka | |
| 2005/0207345 A1 | 9/2005 | Onggusanusi et al. | |
| 2006/0242529 A1 | 10/2006 | Terry et al. | |

FOREIGN PATENT DOCUMENTS

| | | | |
|---|---|---|---|
| CN | 1153479 C | | 6/2004 |
| DE | 10225428 | | 12/2003 |
| EP | 418866 A2 | * | 3/1991 |
| EP | 0 475 698 | | 3/1992 |
| EP | 0 719 016 | | 6/1996 |
| EP | 0 730 382 | | 9/1996 |
| EP | 0877513 A1 | | 11/1998 |
| JP | 62159539 | | 7/1987 |
| JP | 03011835 | | 1/1991 |
| JP | 3175759 | | 7/1991 |
| JP | 06112922 A | | 4/1994 |
| WO | WO 96/21984 | | 7/1996 |
| WO | WO 96/36150 | | 11/1996 |
| WO | WO 96/36154 | | 11/1996 |
| WO | WO 9636154 A1 | * | 11/1996 |
| WO | WO 97/12490 | | 4/1997 |
| WO | WO 0219604 | | 3/2002 |
| WO | WO 2004047356 | | 6/2004 |

OTHER PUBLICATIONS

Tanenbaum, Andrew S., "Computer Networks" 1993, Prentice-Hall International, Inc., Englewood Cliffs, US XP002074002 196050, pp. 24-26 and 373-375.

"Automatic feedback retransmission in short wave data communication", No. 4, 1994, Communications Technology.

Tianfu et al., "Improving ARQ Performance And Dynamically Selecting Frame Size", No. 3, 1993, Computer Applications, Abstract.

Shizhu et al. "Improvement on a Selective Repeat Scheme", vol. 22, No. 11, Journal of Huazhong University of Science and Technology, Nov. 1994, Abstract.

Chuah et al., "Performance Comparisons Of Two Retransmission Protocols For CDMA", Conference Title: 1996 IEEE 46th Vehicular Technology Conference, Mobile Technology for the Human Race (Cat. No. 96CH35894), Part vol. 1, pp. 272-276, 1996.

Non-Final Rejection issued Jun. 23, 2010 in corresponding Korean Application No. 10-2008-7024537.

International Search Report and Written Opinion for International Application No. PCT/IB2007/000836, mailed Jan. 17, 2008.

\* cited by examiner

☐ SUBCHANNEL 0
☐ SUBCHANNEL 1

MULTI-CARRIER RADIO LINK PROTOCOL SUPERVISION IN A RADIO COMMUNICATION SYSTEM

CROSS-REFERENCE TO RELATED APPLICATION(S)

The present application is a Continuation-in-Part of U.S. patent application Ser. No. 09/610,749, filed on Jul. 6, 2000, now U.S. Pat. No. 7,046,642 which is a Continuation of U.S. patent application Ser. No. 08/851,010 filed on May 5, 1997, now U.S. Pat. No. 6,088,342; and a Continuation-in-Part of U.S. patent application Ser. No. 10/285,899, filed Oct. 31, 2002, now U.S. Pat. No. 7,298,701 the contents of both of which are hereby incorporated by reference in their entireties.

BACKGROUND

Exemplary embodiments of the present invention relate to radio communication systems and, more particularly, to a method and apparatus for dynamically configuring a radio link protocol (RLP) for a radio communication system.

Major cellular system types include those operating according to the Global Services for Mobile (GSM) Standard, the TIA/EIA/IS-95 Mobile Station-Base Station compatibility Standard for Dual Mode Wide Band Spread Spectrum Cellular System, the TIA/EIA/IS-136 Mobile Station-Base Station Compatibility Standard, and the TIA/EIA 553 Analog Standard (AMPS/TACS). Other major cellular systems include those operating in the personal communications system (PCS) band according to the IS-95 based ANSI-J-STD-008 1.8-2.0 GHz standard or, those operating according to the GSM-based PCS1900 (1900 MHz frequency range) standard.

Currently, each of the major cellular systems standards bodies are implementing data services into their digital cellular specifications. A packet data service specification has been finalized for GSM and, packet data service specifications compatible with the IS-95 and IS-136 standards are being prepared. Another example of a data service is the TIA/EIA IS-99 Data Services Option Standard for Wideband Spread Spectrum Digital Cellular System (IS-99). IS-99 defines a connection-based packet service for IS-95-A based networks. The IS-99 system provides a standard for asynchronous data service (Service Option 4) and digital Group-3 facsimile service (Service Option 5).

In an IS-99 based system, a radio link protocol (RLP) is utilized to provide an octet stream service over IS-95-A forward and reverse traffic channels. Each octet comprises 8 bits of digital data. The octet stream service carries the variable length data packets of the point-to-point protocol layer. The RLP divides the point-to-point protocol packets into IS-95-A traffic channel frames for transmission. There is no direct relationship between point-to-point protocol packets and IS-95-A frames. A large packet may span several IS-95-A traffic channel frames, or a single traffic channel frame may include all or part of several point-to-point packets. The RLP does not take the higher level traffic channel framing into account, but operates on a featureless octet stream, delivering the octets in the order received from the point-to-point layer. The data may be transmitted on the traffic channel as primary traffic or, for example, along with speech as secondary traffic. Data may also be transmitted in a signaling subchannel. IS-95 multiplex option 1 may be used at full rate, half rate and eighth rate for primary traffic and at rate 1, rate ⅞, rate ¾, and rate ½, for secondary traffic.

The RLP utilizes RLP control frames to control the transmission of data and RLP data frames for the transmission of data at the RLP level.

The format of RLP control and data frames is defined so that each RLP frame includes a 8-bit sequence number field (SEQ). Each RLP data frame SEQ field contains the sequence number of that particular data frame. The sequence numbers are used to identify each received data frame and allow determination of data frames that have not been received. The RLP control frame SEQ field is not used to indicate the sequence number of the control frame, but contains the next data frame sequence number to allow quick detection of erased data frames.

In addition to the SEQ field, each RLP data frame includes a number of data bits, with up to a maximum number of data bits allowed for each frame. The maximum number of data bits allowed in a data frame depends upon the IS-95 multiplex subchannel used. For example, for primary traffic on the traffic channel, using multiplex option 1 at IS-95 full rate, the maximum number of data bits allowed is 152 and, for primary traffic on the traffic channel, using multiplex option 2 at IS-95 half rate, the maximum number of data bits allowed is 64. When less than the maximum number of bits is transmitted in a frame, padding is used to fill out the data field to 152 bits. Each RLP data frame also includes a RLP frame type (CTL) field, and a data length (LEN) field. The LEN field indicates the length of the data in the frame in octets. For unsegmented data frames, the CTL frame is one bit and is set to 0. For segmented data frames, the CTL frame contains 4 bits and can be set to indicate whether the data in the frame includes the first LEN octets, the next LEN octets, or, the last LEN octets of the unsegmented data frame.

The RLP control frame may function as a negative acknowledgement (NAK) RLP control frame. A NAK RLP control frame includes a 4-bit CTL field, a 4-bit LEN field, an 8-bit FIRST field, an 8-bit LAST field, a reserved field (RSVD), a frame check sequence field (FCS) and padding. An RLP control frame having the frame type field set to indicate NAK may then be used to request retransmission of a particular data frame, or a particular sequence of data frames. For example, a mobile station expecting a data frame having a particular sequence number would transmit a NAK control frame to the BS if the MS determined that the data frame was missed. The FIRST and LAST fields of the RLP NAK control frame are used to indicate the particular data frame, or sequence (indicated as a range beginning at the sequence number indicated by the FIRST field and ending at the sequence number indicated by the LAST field) of data frames that are requested to be retransmitted. In IS-99, the number of requests for retransmission of a data frame is a set number and the initiation of the requests for retransmission is controlled by a NAK retransmission timer. When RLP frames are carried as primary or secondary traffic, the retransmission timer is implemented as a frame counter. When RLP frames are carried in the signaling subchannel also known as a sub-carrier, the retransmission timer is implemented as a timer having a duration equal to a predetermined value, T1m, that is defined in Appendix D of IS-95-A. The NAK retransmission counter for a data frame is started upon the first transmission of a NAK RLP control frame requesting retransmission of that data frame.

If the data frame has not arrived at the receiver when its NAK retransmission timer expires, the receiver sends a second NAK control frame requesting retransmission of that data frame. This NAK control frame is transmitted twice. The NAK retransmission timer for this data frame is then restarted. If the data frame has not arrived at the receiver when its NAK retransmission timer has expired twice, the receiver sends a third NAK control frame requesting retransmission of that data frame. Each NAK control frame transmitted as the result of a retransmission timer expiring a second time is transmitted three times.

A NAK abort timer is then started in the receiver upon transmission of the third NAK control frame. The NAK abort timer is implemented, and expires, identically to the NAK retransmission timer. If the data frame has not arrived at the receiver when its NAK abort timer has expired, the NAK is aborted and no further NAK control frames are transmitted for that data frame.

The IS-99 NAK scheme results in a maximum number of three retransmission requests (including a maximum number of six NAK RLP control frames) being transmitted for a particular unreceived data frame.

As cellular radio communication systems evolve, various high speed data (HSD) service options will be implemented into the different cellular system standards. For example, several HSD options are being considered for implementation into the IS-95-A standard. These HSD options may include IS-95-A based systems having the capability to transmit data at rates of up to 78.8 kbps. Use of any of these options in IS-95-A will increase the range of services and applications that can be supported. For an IS-99 based system, an increase in the number of services and applications that the system may support will require that the system support data services having different bandwidth, delay sensitivity and quality of service requirements (QoS).

Different bandwidth, delay sensitivity and quality of service requirements may require different bit-error-rate (BER), and delay requirements. A fixed-frame header and fixed-NAK retransmission procedure such as that of IS-99 may not be optimally configured for certain data services that must be supported. For example, it may be that a service with low QoS requirements (high BER allowed) may experience large delays from a NAK retransmission procedure in a system having a predetermined number of retransmissions, when it is not really necessary to retransmit missing data frames the predetermined number of times in order to provide acceptable service. Another example of non-optimization in a data packet service using a fixed frame header, such as that of IS-99, could occur if a service required high bandwidth and included large numbers of sequenced data frames to be transmitted as high speed data. This service may use long data sequences having a number of data frames greater than X, which is the maximum number indicated by the full SEQ field of the fixed frame header. In this case, the count in the SEQ field would have to be restarted before a long data sequence was finished. Restarting the count in the sequence field may require more complicated processing of the transmitted and received data than having each frame in the data sequence numbered sequentially. Additionally, if a data service uses a shorter data sequence having a number of data frames less than the maximum number indicated by the SEQ field, this may be non-optimal because bits reserved for the SEQ field go unused in each data frame, when these bits could be used to carry data.

A manner is needed by which to reduce the possibility that the multiple layers of a receiving station might redundantly request retransmission of a data packet. And in multi-carrier wireless communication systems, such as the NxDO system proposed in 3GPP2 to increase the system throughput and user data rate experience, a new mechanism is needed in radio link protocol to enable it to work above multiple radio links in parallel. It is in light of this background information related to communications in a packet radio communication system that the significant improvements of the present invention have evolved.

SUMMARY

The foregoing and other problems are reduced, if not overcome, by systems and methods in accordance with exemplary embodiments of the present invention.

Exemplary embodiments of the present invention may be particularly applicable to communication systems whereby data is transmitted to a communication station over a plurality of subchannels otherwise referred to as sub-carriers. These subchannels may cause unbalanced receipt of data at the communication station. And as such, exemplary embodiments of the present invention facilitate efficient usage of radio capacity in a radio communication system by selectively delaying retransmission requests to provide more time for delayed data to be received at the communication station.

According to one aspect of the present invention, a method is provided for facilitating efficient usage of radio capacity in a radio communication system including a communication station operable to receive, over a plurality of subchannels of the radio communication system. In this regard, the packet-formatted data has an overall sequence (e.g., RLP SEQ), and is divided into a plurality portions receivable by the communication station over respective subchannels, where each portion has a respective link sequence (e.g., LINK SEQ). The method includes detecting missing packet-formatted data at the communication station based upon the overall sequence or at least one of the link sequences. Then, when the missing packet-formatted data is detected based upon the overall sequence, a time period is timed, and when the communication station fails to receive the missing packet-formatted data before the step of timing times out, retransmission of the missing packet-formatted data is requested. On the other hand, when the missing packet-formatted data is detected based upon at least one of the link sequences, retransmission of the missing packet-formatted data can be requested without timing the time period.

Upon receipt of the request, the missing packet-formatted data can be retransmitted to the communication device. In this regard, if so desired, a subchannel can be selected based upon congestion of at least some of the subchannels, such as by selecting a less congested subchannel. The missing packet-formatted data can then be retransmitted over the selected subchannel.

Additionally or alternatively, the method can include estimating a selected delay period by which to delay generation of the request. In this regard, a range of delay period times can be selected, where the range of the delay periods is bounded by a minimum delay period and a maximum delay period. Further, if so desired, a practical delay period time can be estimated, where the practical delay period time comprises a delay period between the minimum delay period time and the maximum delay period time.

In a further aspect of exemplary embodiments of the present invention a method is provided for dynamically configuring parameters of the radio link protocol layer in a radio communication system. The method and apparatus allows dynamic configuration of the radio link protocol layer in order to optimize parameters for use with a particular data service. The radio link protocol parameters may include parameters specifying the configuration of radio link protocol frames and/or other parameters controlling radio link protocol transmissions. The method and apparatus utilizes a configuration procedure that is performed prior to initiation of the data service between two communicating transceiving devices. The configuration may also be performed to reset parameters of the radio link protocol layer during ongoing data service.

As indicated above and explained below, the communication devices and methods of exemplary embodiments of the present invention may solve at least some of the problems identified by prior techniques and provide additional advantages.

BRIEF DESCRIPTION OF THE DRAWINGS

Figure 1:
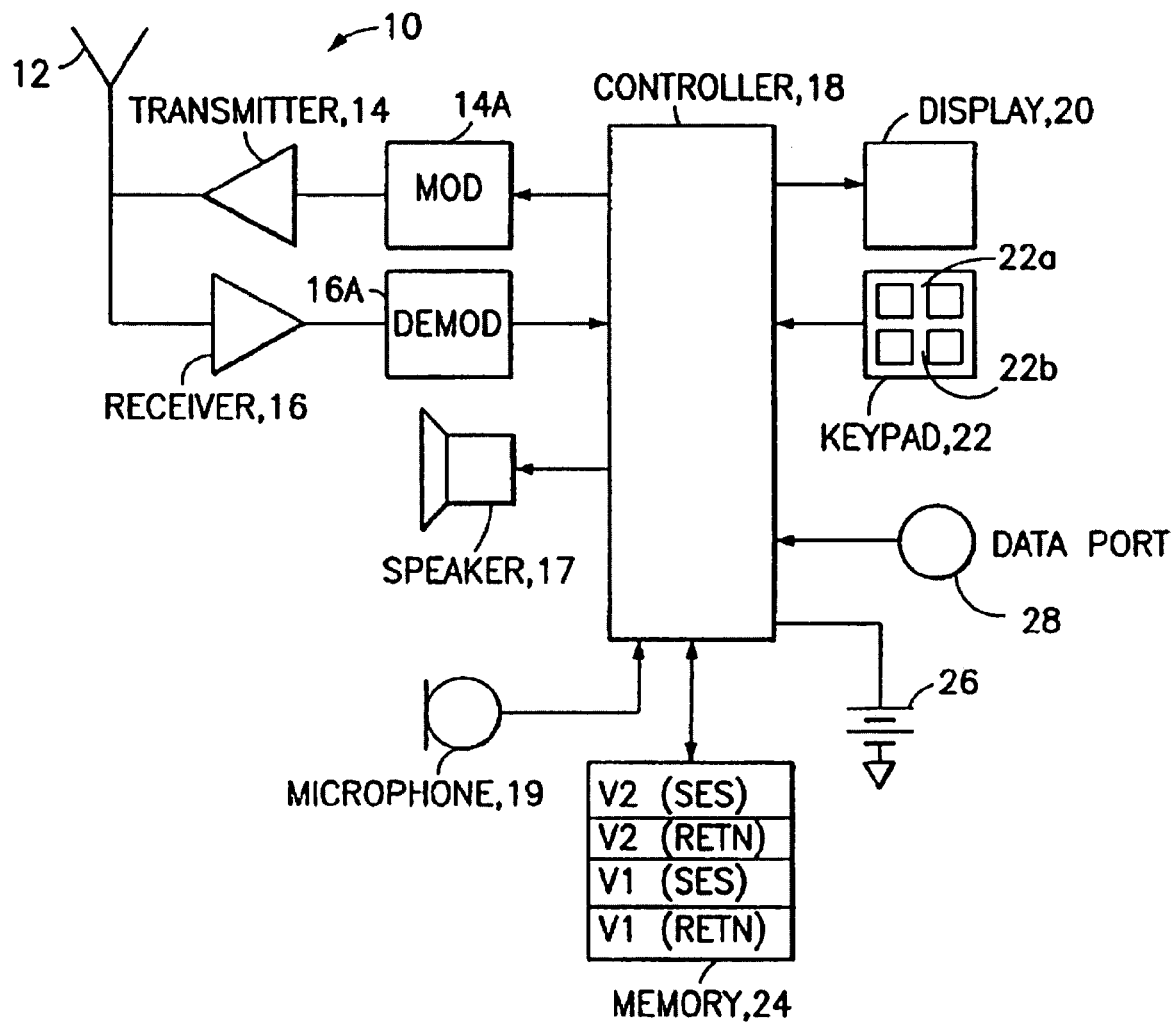
Figure 2:
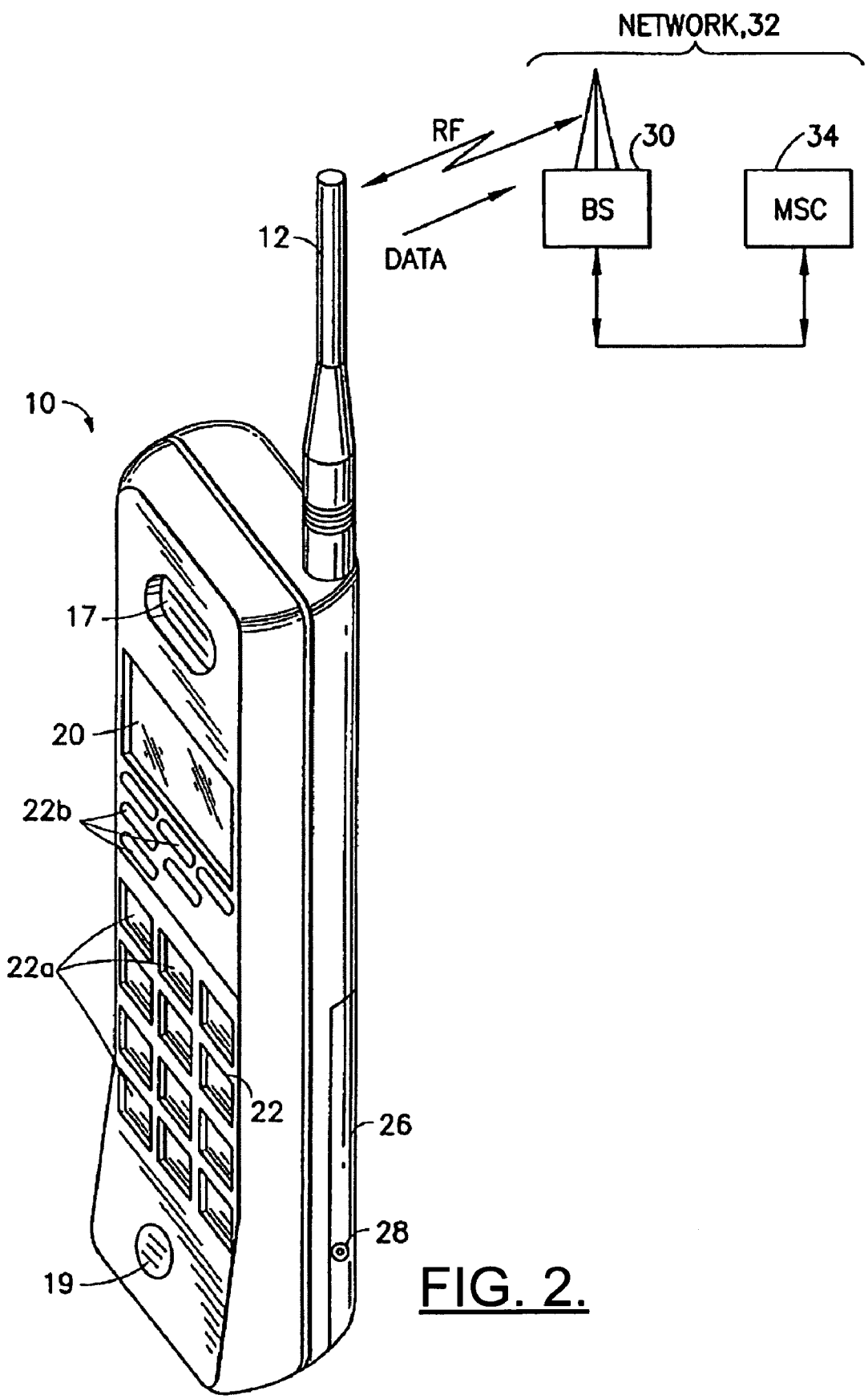
Figure 3A:
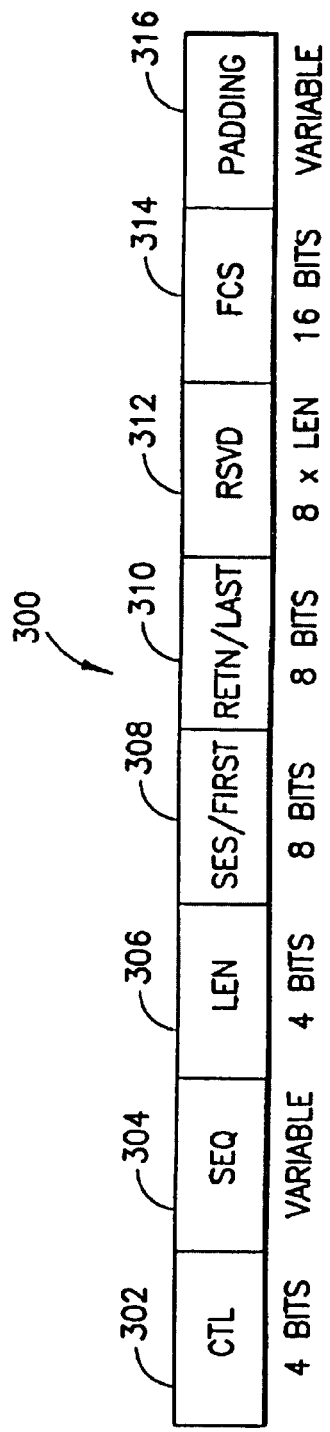
Figure 3B:
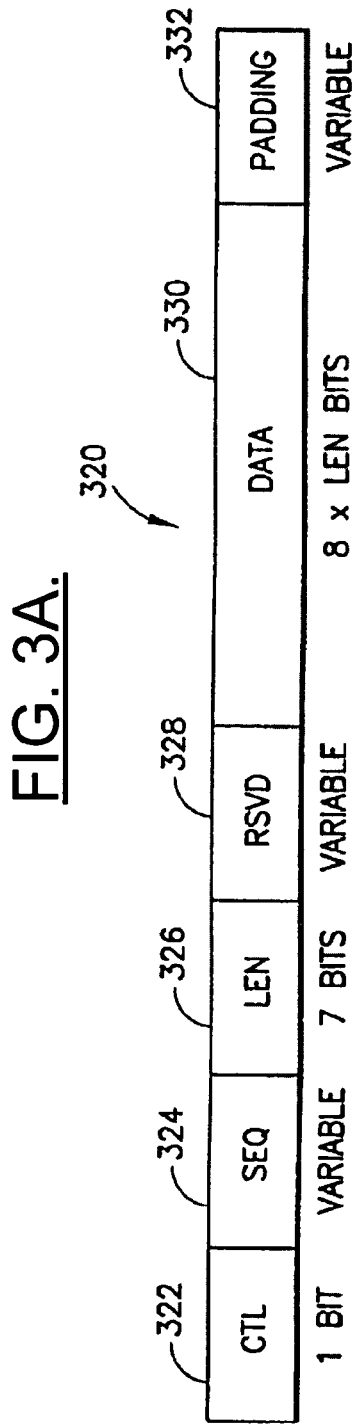
Figure 3C:
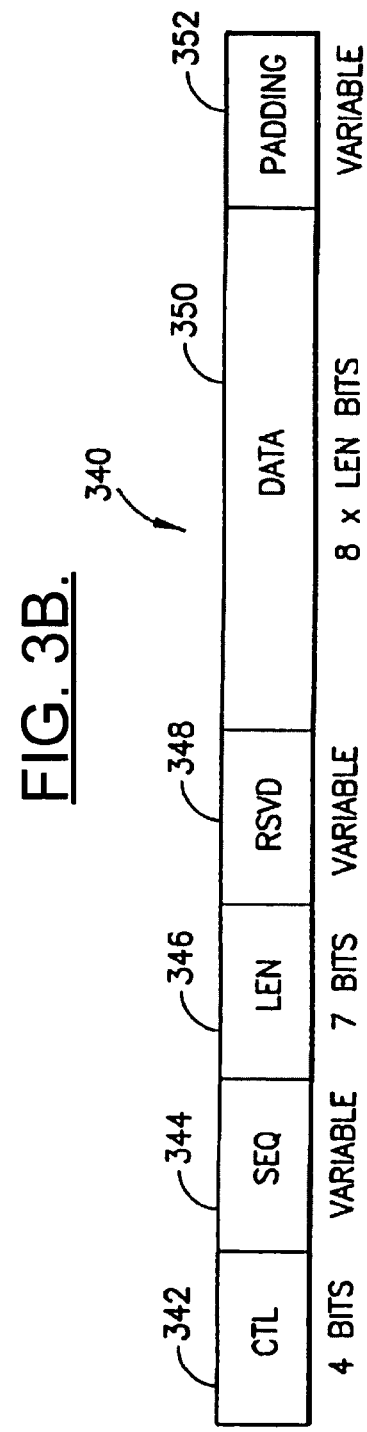
Figure 4A:
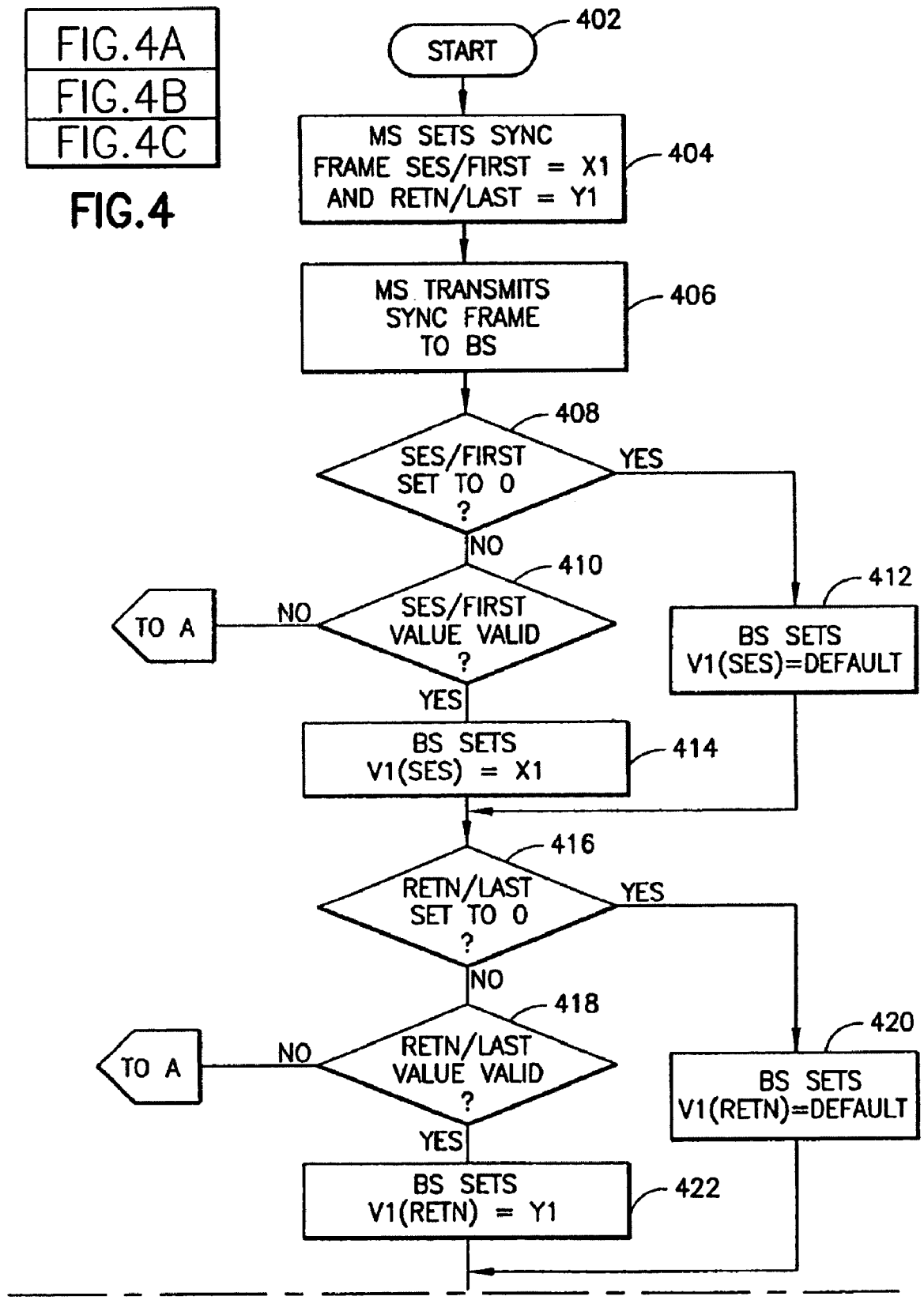
Figure 4B:
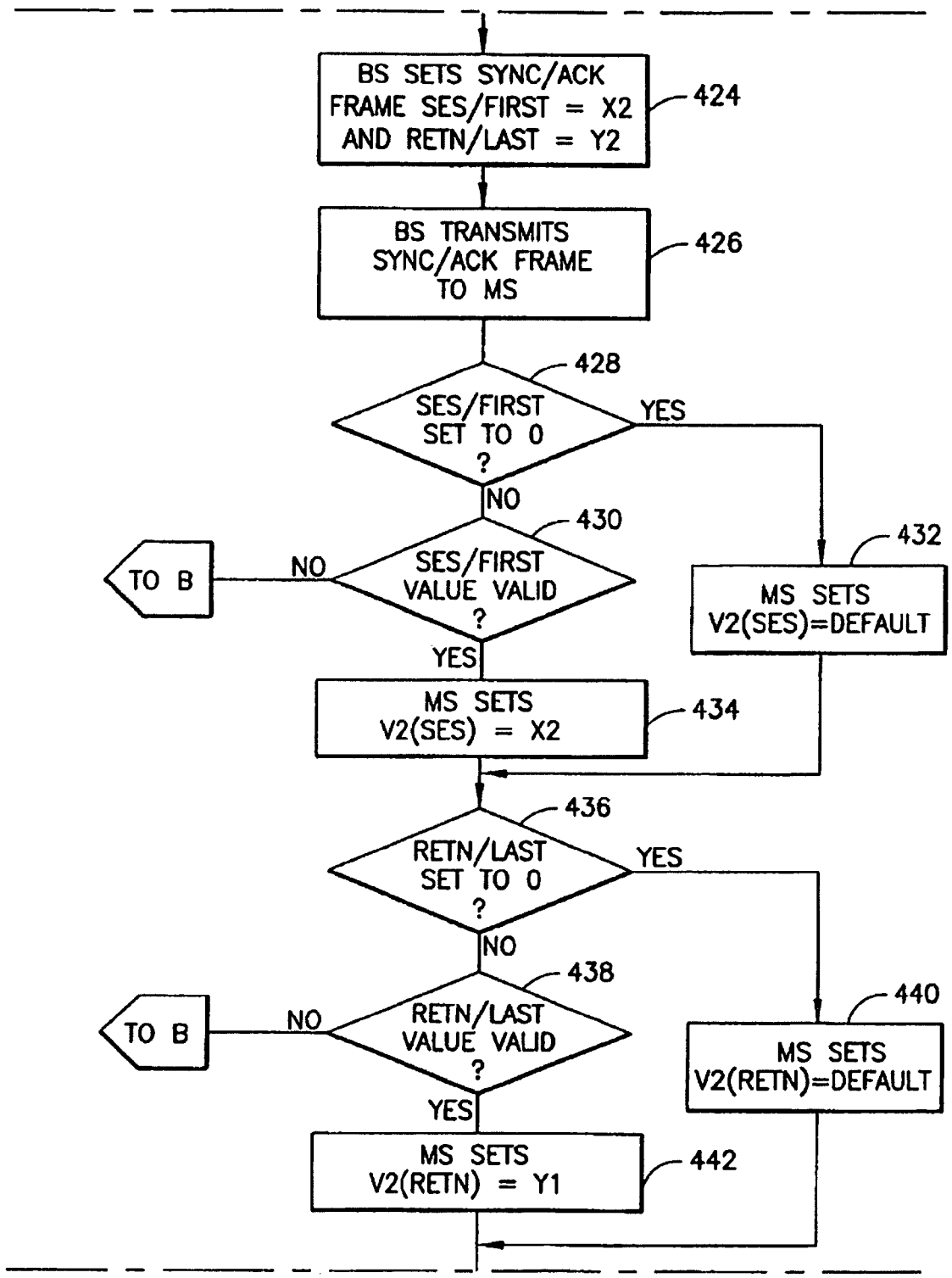
Figure 4C:
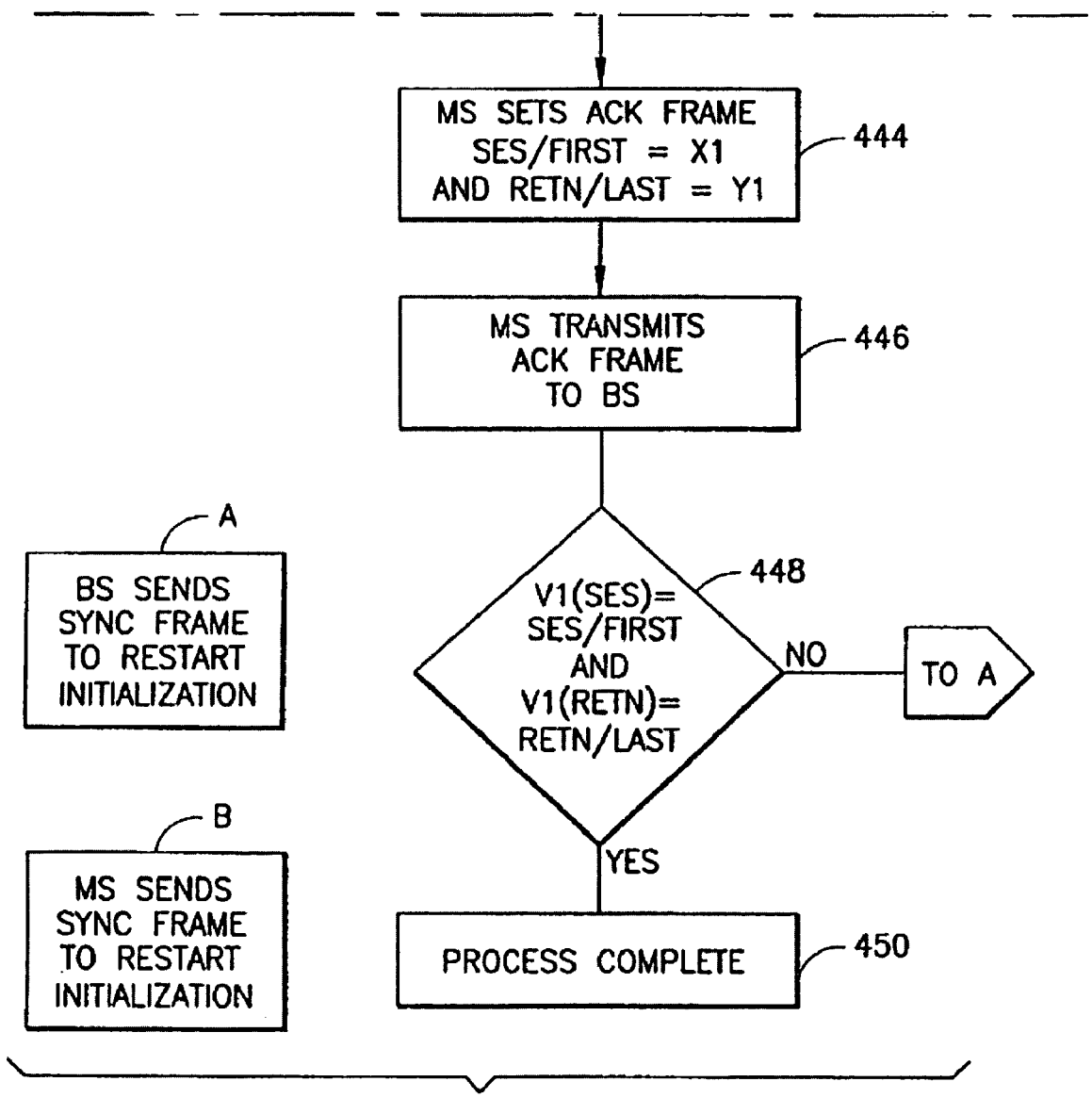
Figure 5:
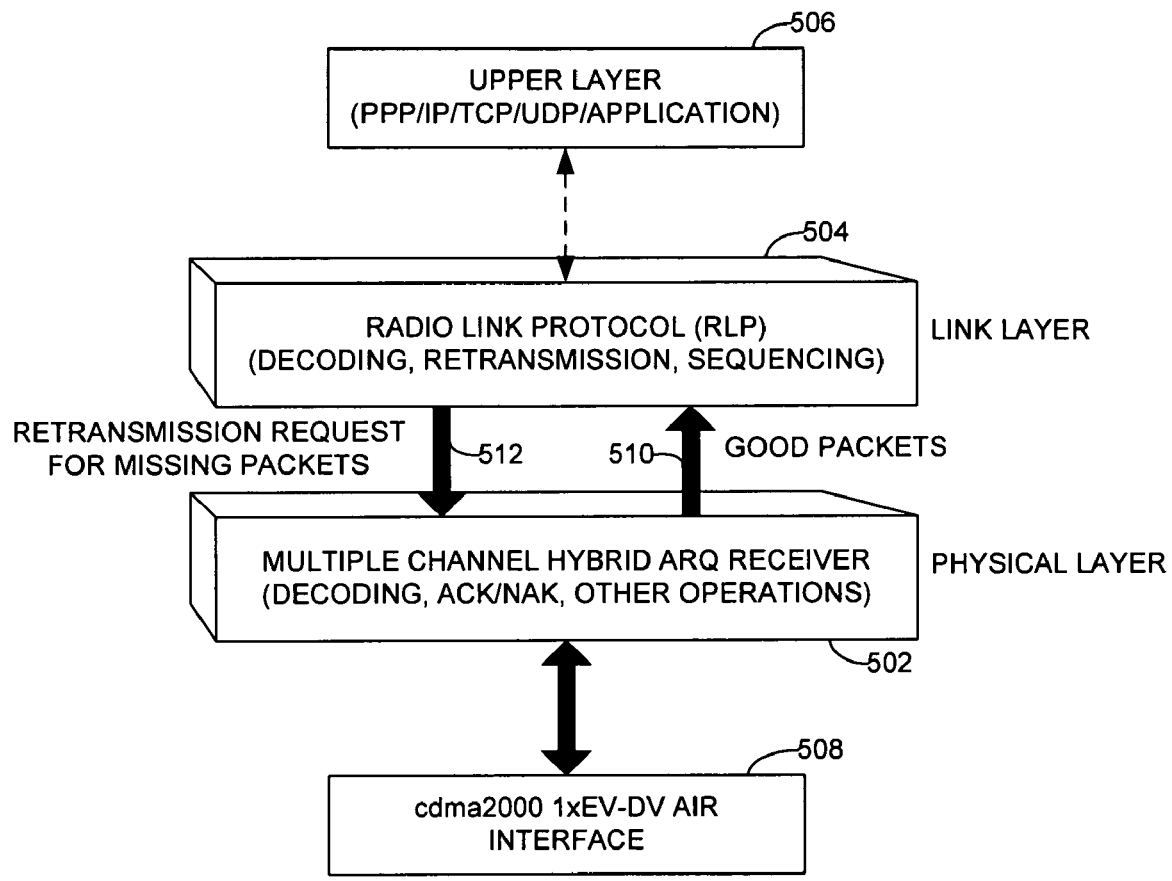
Figure 6:
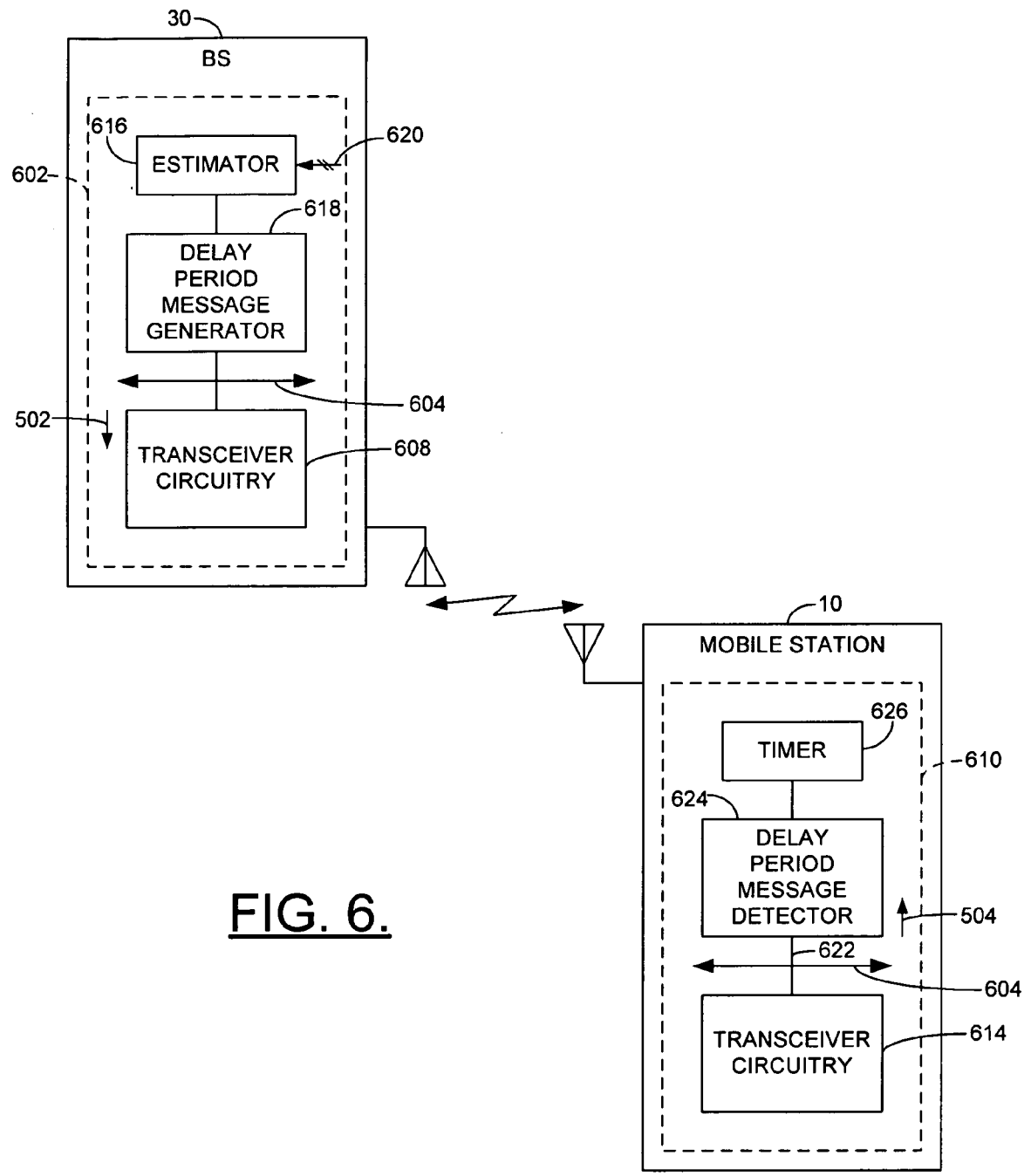
Figure 7:
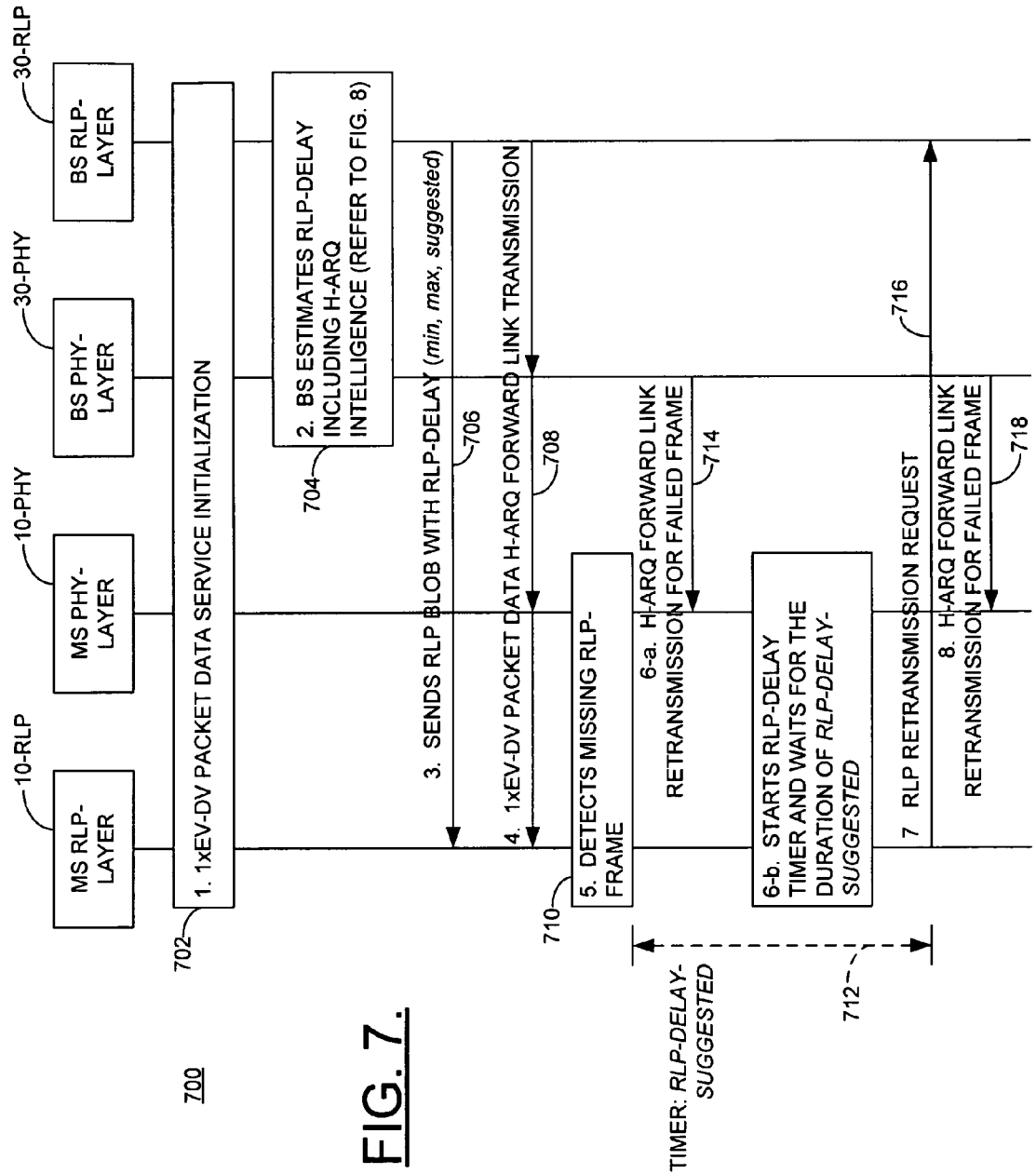
Figure 8:
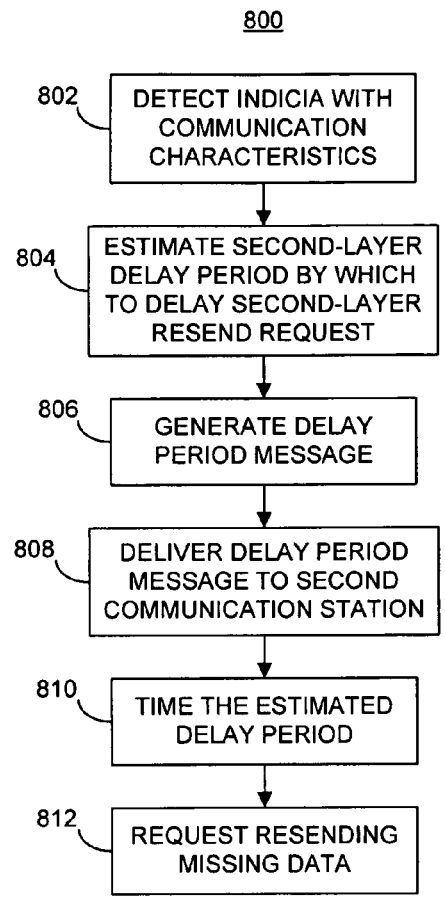
Figure 9:
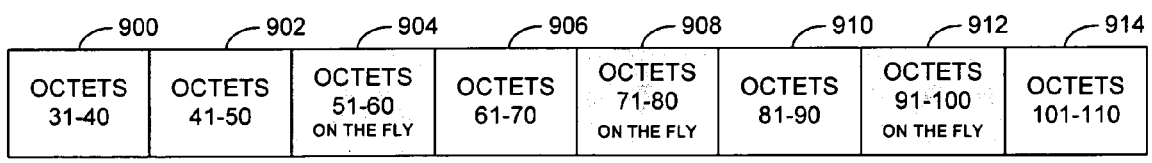
Figure 10:
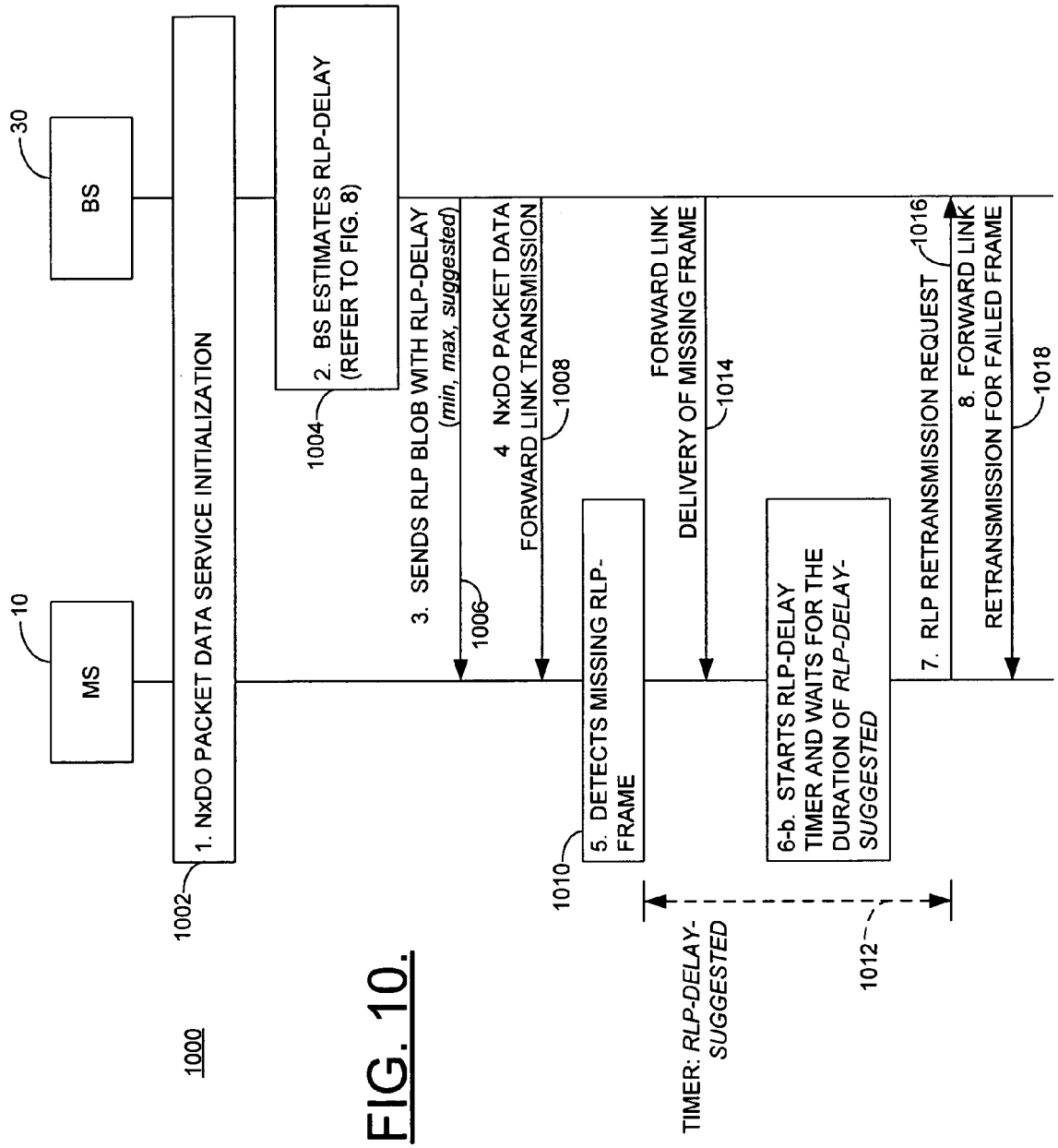
Figure 11:
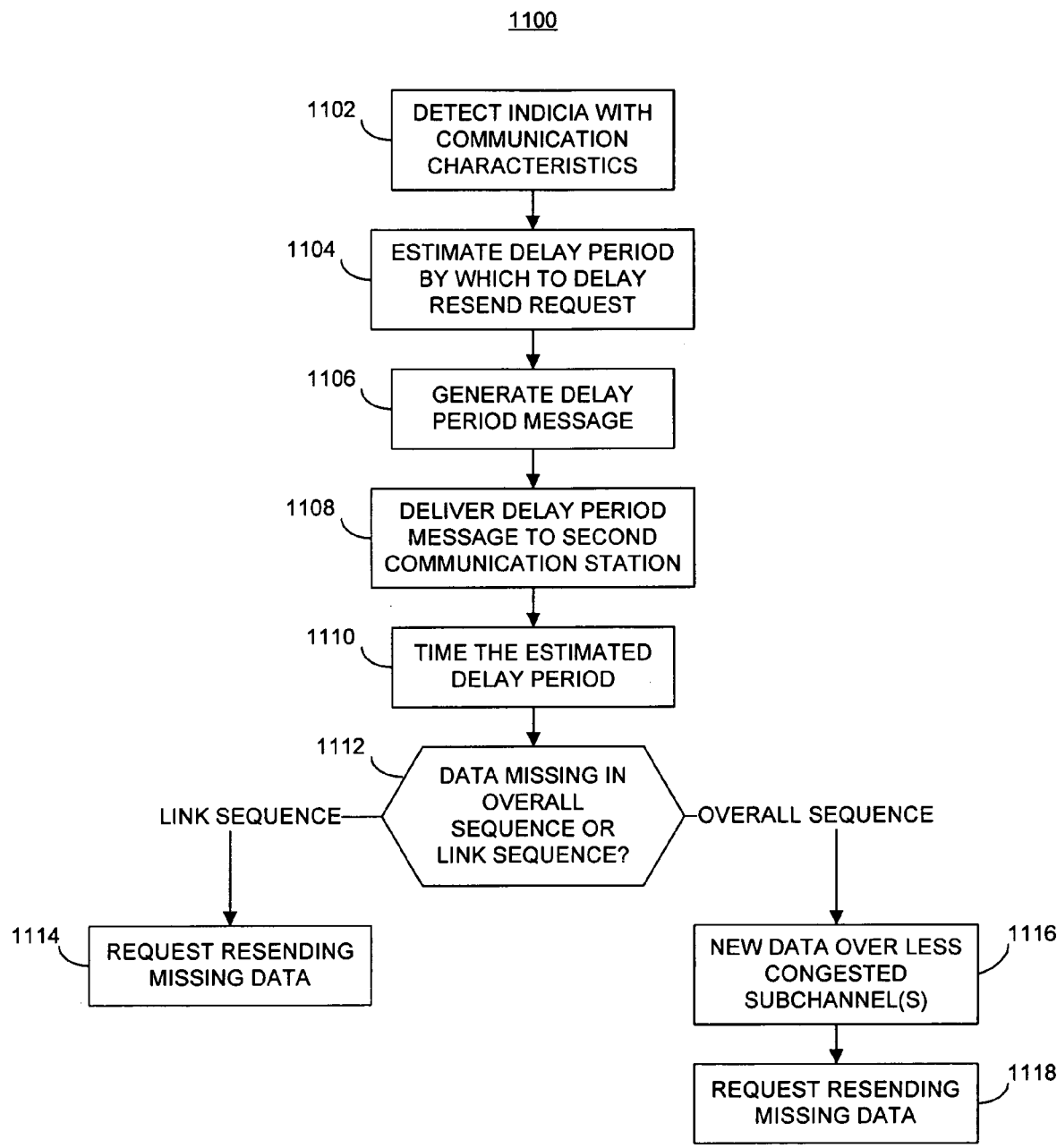

Having thus described exemplary embodiments of the present invention in general terms, reference will now be made to the accompanying drawings, which are not necessarily drawn to scale, and wherein:

FIG. 1 is a block diagram of a cellular terminal that is suitable for practicing exemplary embodiments of the present invention;

FIG. 2 illustrates a system including the terminal of FIG. 1 in communication with a CDMA cellular network, in accordance with exemplary embodiments of the present invention;

FIGS. 3A, 3B and 3C are a pictorial representation of a radio link protocol (RLP) control frame structure employed by a mobile station and a base station to configure the RLP for a communications link between the mobile station and base station, in accordance with exemplary embodiments of the present invention;

FIG. 4 is a flowchart illustrating various steps in a radio link protocol (RLP) configuration method, in accordance with exemplary embodiments of the present invention, the flow diagram being presented as FIGS. 4A, 4B and 4C;

FIG. 5 illustrates a functional representation of logical layers of portions of the communication system shown in FIG. 1;

FIG. 6 illustrates a functional block diagram of the communication system of FIG. 1 in accordance with exemplary embodiments of the present invention;

FIG. 7 illustrates a control flow diagram listing the signaling generated during operation of an exemplary embodiment of the present invention forming a portion of the communication system shown in FIGS. 5 and 6;

FIG. 8 illustrates a flowchart including various steps in a method of operation of an exemplary embodiment of the present invention;

FIG. 9 illustrates an overall sequence of data packets or frames transmitted over a plurality of sub-channels in an unbalanced manner, in accordance with exemplary embodiments of the present invention;

FIG. 10 illustrates a control flow diagram listing the signaling generated during operation of another exemplary embodiment of the present invention forming a portion of the communication system shown in FIGS. 5 and 6; and FIG. 11 illustrates a flowchart including various steps in a method of operation of another exemplary embodiment of the present invention.

DETAILED DESCRIPTION

Exemplary embodiments of the present invention now will be described more fully hereinafter with reference to the accompanying drawings, in which preferred exemplary embodiments of the invention are shown. Exemplary embodiments of the present invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring now to FIGS. 1 and 2, therein are illustrated a wireless user terminal or mobile station (MS) 10 and cellular network 32 suitable for practicing exemplary embodiments of the present invention. The MS includes an antenna 12 for transmitting signals to, and for receiving signals from, a base site or base station (BS) 30. The BS is a part of cellular network 32 that includes a mobile switching center (MSC) 34. The MSC provides a connection to landline trunks when the MS is involved in a call.

The MS 10 includes a modulator (MOD) 14A, a transmitter 14, a receiver 16, a demodulator (DEMOD) 16A, and a controller 18 that provides signals to and receives signals from modulator and demodulator, respectively. These signals may include signaling information, and also speech, data and/or packet data transmitted between MS and BS 30 in accordance with the air interface standard of the applicable cellular system.

Controller 18 may be comprised of a digital signal processor device, a microprocessor device, and various analog to digital converters, digital to analog converters, and other support circuits. The control and signal processing functions of the MS can be allocated between these devices according to their respective capabilities. MS 10 also includes a user interface comprised of a conventional earphone or speaker 17, a conventional microphone 19, a display 20, and a user input device, typically a keypad 22, all of which can be coupled to the controller 18. The keypad includes the conventional numeric (0-9) and related keys (#,*) 22a, and other keys 22b used for operating the MS. These other keys may include, by example, a SEND key, various menu scrolling and soft keys, and a PWR key. The MS may also include a battery 26 for powering the various circuits that may be required to operate the MS.

The MS 10 also includes various memories, shown collectively as the memory 24, wherein may be stored a plurality of constants and variables that may be used by the controller 18 during the operation of the MS. For example, the memory may store the values of various cellular system parameters and the number assignment module (NAM). An operating program for controlling the operation of controller can also be stored in the memory (e.g., in a ROM device). The memory may also store data prior to transmission or after reception. The memory also includes routines for implementing the method of radio link protocol configuration according to the described exemplary embodiment of the present invention.

The MS 10 may also function as a data terminal for transmitting or receiving data. As such, in this case MS may be connected to a portable computer or a fax machine through a suitable data port (DP) 28.

The BS 30 also includes the necessary transmitters and receivers to allow signal exchange with MS 10. Controllers, processors and associated memories that may be located in the BS or MSC 34 provide control of the BS and MSC, and implement routines for the method and apparatus according to the described exemplary embodiments of the present invention.

In one exemplary embodiment of the present invention, the MS 10 and the network 32 operate using a direct-sequence code division multiple access (DS-CDMA) system, which is based on the IS-95A system standard. The network may operate in the 800 MHz frequency range according to IS-95A standard, or in the 1.8-2.0 GHz range according to the IS-95-based ANSI-J-STD-008 standard. The network may provide a service option feature based on the IS-99 standard, and may also use high speed data techniques that have been proposed for CDMA-based systems to provide higher speed data transmission than that which may otherwise be provided by the present IS-95A and IS-99 standards. In this regard, the MS and the network may operate using a number of different systems without departing from the spirit and scope of the present invention. For example, the MS and the network may operate using a cdma2000 or cdma2000-based system, such as 1xEV-DO, 1xEV-DV, NxDO, 1XTREME, L3NQS. It should be understood, however, that exemplary embodiments of the present invention may be analogously implementable in cellular and other communication systems operable pursuant to other communication schemes.

In various instances, for example, more than one Walsh channel may be used on the forward link to provide high speed data by simultaneously carrying separate data that belongs to the same user transmission. On the reverse link, multiplexed channels may be used to increase the data rate. In this method, serial data may be input to a transmitter/modulator at an input data rate that is higher than the base data transmission rate. The serial data can be received over a time period having a duration equal to the duration of the 20-millisecond IS-95 transmission frame and demultiplexed into a plurality of sets of input data. Each of the plurality of sets of input data can then be processed in one of a plurality of subchannels using a system channel encoding and interleaving scheme to generate a plurality of sets of processed data. An output serial data stream can then be generated by multiplexing the plurality of sets of processed data from the subchannels together. The serial output stream can be generated so that the originally received serial data included in the serial output data stream can be generated at the input data rate. The serial output data stream can then be spread to generate at least one spread data stream, and transmitted on the channel during a second time period having a duration equal to the duration of the IS-95 transmission frame so that the serial data included in the spread data stream(s) can be transmitted at the input data rate.

In accordance with exemplary embodiments of the present invention, the IS-99 RLP data and control frames can be modified so that the frames may be used in a RLP configuration process performed upon initiation or reset of a data service. Referring now to FIGS. 3A, 3B and 3C, therein are illustrated structures for a RLP control frame 300, an unsegmented RLP data frame 320, and a segmented RLP data frame 340, respectively, that may be employed by a MS and BS to implement a dynamic RLP protocol in accordance with exemplary embodiments of the present invention. The RLP control frame 300 can include a RLP frame type (CTL) field 302, a RLP sequence number (SEQ) field 304, a reserved octet length (LEN) field 306, a RLP sequence size/first sequence number (SES/FIRST) field 308, a retransmission number/last RLP sequence number (RETN/LAST) field 310, a reserved (RSVD) field 312, a frame check RLP sequence (FCS) field 314, and padding 316. The unsegmented RLP data frame 320 can include a CTL field 322, SEQ field 324, LEN field 326, RSVD field 328, DATA field 330 and padding 332. And the segmented RLP data frame 340 can include a CTL field 342, SEQ field 344, LEN field 346, RSVD field 348, DATA field 350 and padding 352.

To implement exemplary embodiments of the present invention, the RLP control and data frame structure can be modified from the IS-99 structure so that the positions of the CTL and SEQ fields in the RLP control and data frames are exchanged as compared to IS-99, and so that the RLP data frame SEQ fields 324 and 344 are variable in length. In the RLP control frames, the FIRST and LAST fields can be modified to provide the SES and RETN functions, respectively. And in the unsegmented and segmented RLP data frames 320 and 340, the RSVD fields 328 and 348, respectively, can be added to account for the variable length of the SEQ field.

The CTL field 302 can indicate the RLP control frame type, such as whether the RLP control frame is a negative acknowledgement (NAK) control frame, SYNC control frame, an acknowledgement (ACK) control frame, or a synchronization/acknowledgement (SYNC/ACK) control frame. The LEN field 306 can indicate the length of RSVD field in octets, and the FCS field 314 can provide a frame check RLP sequence that provides an error check on the control frame 300. For the unsegmented data frame 320, the CTL field 322 may be one bit and may be set to 0. For the segmented data frame 340, the CTL field 342 can indicate whether the data frame 340 includes the first, last, or a middle segment of the segmented data. The LEN fields 326 and 346 can indicate the length of the DATA field 330 and 340, respectively.

The memory associated with the controller in each of the MS 10 and BS 30 can store values for V1(ses), V1(retn), V2(ses) and V2(retn), as shown in FIG. 1 with respect to the MS. In this regard, V1(ses) can represent the size, in bits, of the SEQ fields 304, 324 or 344 when a RLP frame is transmitted on the forward link, and V1(retn) can represent the maximum number of retransmission requests allowed on the reverse link for an unreceived data frame previously transmitted on the forward link. V2(ses) can represent the size, in bits, of the SEQ fields 304, 324 or 344 when an RLP frame is transmitted on the reverse link, and V2(retn) can represent the maximum number of retransmission requests allowed on the forward link for an unreceived data frame previously transmitted on the reverse link.

The values V1(ses) and V1(retn) can be determined in BS 30, and the values V2(ses) and V2(retn) can be determined in MS 10. These values may be determined by the controllers within the MS and BS according to information on the implemented data service, such as based upon data rate, number of frames, the quality of service (QoS) or the like. Alternatively, the appropriate values may be input to MS and BS from the termination points of the data link, such as from a fax machine connected to MS. The values can then be exchanged during radio link protocol configuration so that each of MS and BS has the protocol information for both forward and reverse links. The controllers in MS and BS can then be configured to format and transmit RLP frames, transmit retransmission requests, and receive RLP frames according to these values.

Reference is now made to FIG. 4, which illustrates a flowchart including various steps in a radio link protocol configuration procedure according to exemplary embodiments of the present invention. The procedure of FIG. 4 may be performed upon initiation of a data service between MS 10 and network 32 of FIG. 2. Additionally or alternatively, the procedure of FIG. 4 may be performed to reset the RLP protocol parameters for an already initiated data service. Although described in the context of a MS originated synchronization procedure, it should be realized that the process is symmetrical, and that the BS 30 can originate the procedure as well.

As shown, the process begins at step 402. The configuration can be implemented so that the configuration process is embedded in the connection initialization process. The messages exchanged can perform the dual function of initializing the connection and configuring the dynamic RLP. At step 404, the RLP configuration process can begin using modified RLP control frames 300 in accordance with exemplary embodiments of the present invention (see FIG. 3A). A SYNC control frame (CTL=1101) can be formatted within MS 10 having the SES/FIRST field 308 set to the value of X1, and the RETN/LAST field 310 set to the value of Y1. At step 406, the MS 10 can transmit the SYNC control frame to the BS 30. Then, at step 408, a determination can be made within the BS as to whether or not SES/FIRST field 308 of the SYNC control frame is set to 0, i.e., whether X1 has been assigned the value of 0. If the SES/FIRST field 308 is set to 0, the process can move to step 412 where the value $V_1(ses)$ can be set to a default size (e.g., 8 bits) of the SEQ field 322/344 to be used on the reverse link for RLP data frames. The process can then move to step 416.

If, however, at step 408, it can be determined that SES/FIRST field 308 is not set to 0, the process can move to step 410 where a determination can be made within the BS 30 as to whether or not the value of X1 in the SES/FIRST field 308 is a valid value. In this regard, to be considered a valid value, the value of SES/FIRST field 308 must be within a predetermined range (e.g., from 8 to 12). If the value of SES/FIRST field 308 is not valid, the process can move to the block labeled as "A." In this case, the entity detecting the invalid condition restarts the initialization procedure. For example, if the BS detects an invalid parameter at step 410, the BS can send a SYNC frame to the MS 10. And since the MS is expecting a SYNC/ACK frame, the receipt of the SYNC frame can indicate to the MS that the BS found one or more parameters objectionable, and accordingly replied with BS preferred parameters.

If, however, the value of SES/FIRST field 308 is valid, the process moves to step 414 where V1(ses) can be set to X1 within the BS 30. The BS can now be configured to use X1 for the size, in bits, of the SEQ field 322/344 for RLP data frames 320/340 received on the reverse link from MS 10.

Next, at step 416, a determination can be made within the BS 30 as to whether the RETN/LAST field 310 of RLP control frame 300 is set to 0, i.e., whether Y1 has been assigned the value of 0. If RETN/LAST field 310 is set to 0, the process can move to step 420. At step 420, the value $V_1(retn)$ can be set to a default maximum number of retransmission requests (e.g., 0) from BS 30 for unreceived RLP data frames transmitted from the MS 10 on the reverse link. The process can then move to step 424.

If, however, at step 416, it can be determined that RETN/LAST field 310 is not set to 0, the process can move to step 418 where a determination can be made within the BS 30 as to whether or not the value of Y1 in the RETN/LAST field 310 is a valid value. In this regard, to be considered a valid value, the value of RETN/LAST field 310 should be a value within a predetermined range (e.g., from 0 to 3). If the value of RETN/LAST field 310 is not valid, the process can move to the block labeled as "A," as described above, and the synchronization procedure can begin again. On the other hand, if the value of RETN/LAST field 310 is valid, the process can move to step 422 where the value V1(retn) can be set to Y1 within the BS. The BS can now be configured to use Y1 for the maximum number of retransmission requests to be allowed from the BS for unreceived RLP data frames transmitted from MS 10 on the reverse link.

Next, at BS-executed step 424, a SYNC/ACK control frame (CTL=1111) can be formatted with SES/FIRST field 308 set to the value of X2, and the RETN/LAST field 310 can be set to the value of Y2. At step 426, the BS 30 can transmit the SYNC/ACK control frame to the MS 10. Next, at step 428, a determination can be made within the MS as to whether or not the SES/FIRST field 308 of SYNC/ACK control frame is set to 0, i.e., whether X2 has been assigned the value of 0. If the SES/FIRST field 308 is set to 0, the process can move to step 432 where the value V2(ses) can be set to a default size (e.g., 8 bits) of the SEQ field 322/344 to be used on the forward link for RLP data frames. The process can next move to step 436.

If, however, at step 428, it can be determined that the SES/FIRST field 308 is not set to 0, the process can move to step 430. At step 430, a determination can be made within the MS 10 as to whether or not the value of X2 in the SES/FIRST field 308 is a valid value. To be considered a valid value, the value of SES/FIRST field 308 must be a value within a predetermined range. For example, as for V1(ses), the predetermined range may be from 8 to 12. If the value of SES/FIRST field 308 is not valid, the process can move to the block labeled as "B" (in this case equivalent to step 402) where the MS sends a SYNC frame to the BS 30, thereby restarting the synchronization process. On the other hand, if the value of SES/FIRST field 308 is valid, the process can move to step 434 where V2(ses) can be set to X2 within the MS. The MS can now be configured to use X2 for the size, in bits, of the SEQ field 322/344 for RLP data frames 320/340 received on the forward link from the BS.

Next, at step 436, a determination can be made within the MS 10 as to whether the RETN/LAST field 310 of the SYNC/AK control frame is set to 0, i.e., whether Y2 has been assigned the value of 0. If the RETN/LAST field 310 is set to 0, the process can move to step 440 where $V_2(retn)$ can be set to a default maximum number of retransmission requests (e.g., 0) allowed from the MS for unreceived RLP data frames transmitted from BS 30 on the forward link. The process can next move to step 444.

If, however, at step 436, it can be determined that the RETN/LAST field 310 is not set to 0, the process can move to step 438 where a determination can be made within the MS 10 as to whether or not the value of Y2 in the RETN/LAST field 310 is a valid value. To be considered a valid value, the value of RETN/LAST field 310 must be a value within a predetermined range. For example, as for V2(retn), the predetermined range may be from 0 to 3. If the value of RETN/LAST field 310 is not valid, the process can move to the block labeled as "B," as described above. On the other hand, if the value of RETN/LAST field 310 is valid, the process can move to step 442 where V2(retn) can be set to Y2 within the MS. The MS can now be configured to use Y2 for the maximum number of retransmission requests to be allowed from the MS for unreceived RLP data frames transmitted from BS 30 on the forward link.

Next, at step 444, an ACK control frame (CTL=1101) can be formatted with SES/FIRST field 308 set to the value of X1 and the RETN/LAST field 310 set to the value of Y1. At step 446, the MS 10 can then transmit the ACK control frame to the BS 30. The ACK control frame serves as confirmation from MS 10 to BS 30 that the control frames required for configuring the RLP have been exchanged. Then, at step 448, a determination can be made within BS 30 as to whether or not the SES/FIRST field 308 of the ACK control frame 300 is set to X1, and whether or not the RETN/LAST field 310 is set to Y1. If the SES/FIRST field 308 is set to X1 and the RETN/LAST field 310 is set to Y1, the configuration can be confirmed, with the process moving to step 450. At step 450, the configuration process can end, and data transmission between the MS and BS can proceed. In this regard, RLP frames transmitted by the MS on the reverse link can be received by the BS according to X1, and retransmission requests for those can be transmitted by the BS according to Y1. Also, RLP frames transmitted by the BS on the forward link can be received by the MS according to X2, and retransmission requests for those frames can be transmitted by the MS according to Y2.

Although described above with respect to certain programmable parameters (i.e., the RLP sequence number field and number of retransmissions), it is within the scope of exemplary embodiments of the present invention to provide other programmable parameters. For example, the number of CRC check bits can be made programmable and can be specified using the signaling described above.

In various instances, the system utilizes more than one packet-formatting layer, each of which uses a packet retransmission scheme, such as an RLP layer positioned upon a lower-layer that utilizes H-ARQ (hybrid automatic request) packet retransmissions. Thus, in addition to or in lieu of dynamically configuring parameters of the RLP layer to optimize parameters for use with a particular data service, exemplary embodiments of the present invention permit selectively delaying RLP or other retransmission requests at that layer to provide more time at a lower-layer (e.g., H-ARQ) for the lower-layer retransmission scheme to be carried out. In accordance with this aspect of exemplary embodiments of the present invention, prior to sending the higher logical-layer retransmission request, a delay time is required to elapse. If, upon timing-out of the delay time, data is not adequately received, the RLP or other higher logical-layer retransmission request (e.g., NAK RLP control frame) is sent. In this regard, the delay time can comprise a selectable value, selected responsive to indicia associated with communications in the communication system.

FIG. 5 illustrates a logical-layer representation of parts of the communication system shown in FIG. 2, and functionally in FIG. 6, explained below. In this regard, the signals communicated between the MS 10 and BS 30 can comprise data formatted pursuant to packet formatting schemes, such as at multiple, logical layers defined in the system. The logical layers can include, for example, a physical layer 502 and an RLP layer 504 forming the link layer and positioned, functionally, above the physical layer. The RLP layer can function, amongst other things, to perform decoding, retransmission, and sequencing operations. And the physical layer can function, amongst other things, to perform decoding, ACK/NAK, and other operations. Above the RLP layer, the communication system includes one or more upper layers, represented at the block 506 and including, for example, PPP/IP/TCP (UDP) application layers, all conventionally utilized in packet communication systems. And below the physical layer, the communication system includes one or more lower layers, such as the cdma2000 1xEV-DV air interface 508. Finally, as shown, segments 510 and 512 are representative of passage of good packets from the physical layer to the link layer and retransmission requests (e.g., NAK RLP control frames) for missing packets provided by the link layer to the physical layer.

Reference is now made to FIG. 6, which illustrates a functional block diagram of a communication system including a MS 10 and BS 30 of a network 32, in accordance with one aspect of exemplary embodiments of the present invention. As shown, packet formatting can be performed at both the physical layer and at the RLP layer. And both of the layers may utilize a retransmission scheme in which one or more data packets are retransmitted if the respective data packet(s) are not successfully delivered to the intended recipient. For example, data packets sent by the BS to the MS can be positively acknowledged by the MS to be received adequately thereat. Otherwise, the data packet is resent by the BS. Because of the multiple layers of formatting and the corresponding layers of retransmissions that may be requested, redundant retransmission requests might well be generated.

To reduce the likelihood of redundant retransmission requests, in an implementation of an exemplary embodiment of the present invention, the BS 30 includes a BS apparatus 602 that, in turn, includes functional entities that are shown in block form in FIG. 6. The entities forming the BS apparatus can be implemented in any desired manner such as, for example, by computer software that defines algorithms executable by processing circuitry of the BS. The entities of the BS apparatus can include those at the RLP layer of the BS. The RLP layer can include entities positioned above a physical layer. Portions of the BS positioned above segment 604 form parts of higher logical-layers of the BS. And elements of the BS shown below segment 604 in FIG. 6 form the physical layer thereof, again designated at 502. For example, the physical layer is shown to include the transceiver circuitry 608 of the BS.

Analogously, the MS 10 includes a further MS apparatus 610 of an exemplary embodiment of the present invention. Again, the entities forming the MS apparatus positioned at the MS can be functionally represented and can be implemented in any desired manner, such as by algorithms executable by processing circuitry. The elements of the apparatus can be formed at higher logical-layers of the MS, here also represented to be positioned above the line segment 604, again designated at 504. The physical layer of the MS is formed of entities positioned beneath the segment 604. For example, the physical layer includes transceiver circuitry 614 of the MS.

The BS apparatus 602 can include an estimator 616 and a delay period message generator 618 coupled thereto. The estimator can receive communication indicia, herein indicated functionally by way of lines 620 representative of communication characteristics in the communication system. The indicia can be formed, for example, of one or more of indicia types, such as, for example, traffic loading in the communication system, H-ARQ information of active users in the communication system, QoS requirements associated with the users, and radio quality information associated with the users in the communication system. Additionally, communication indicia input into or otherwise received by the estimator may selectively further include historical data associated with delay times in the communication system, such as historical values of estimates performed during operation of the estimator.

Responsive to values of the communication indicia provided thereto, the estimator 616 can form values of delay periods that a subsequent request for retransmission of one or more data packets at the RLP layer (e.g., NAK RLP control frame) should be delayed. The delay period, in one exemplary implementation, comprises a single, suggested RLP delay. And in another exemplary implementation, the delay period comprises a range of possible values, bounded by minimum and maximum delay times and including a suggested RLP delay time within the delay period so-defined. The delay period message generator 618 can generate a message for communication to the MS 10 to report on the estimate made by the estimator. The message formed by the message generator can be provided to a transmit part of the transceiver circuitry 608, thereafter to be broadcast by way of a forward link channel to the MS. In one exemplary implementation, the delay period message generated by the message generator comprises an RLP Block of Bits (BLOB) that includes an RLP-delay (min, max, suggested) field.

When the message is received at the MS 10, the message is provided, shown by way of the line 622, to the MS apparatus 610. And more particularly, the values of the RLP delay message are provided to a delay period message detector 624. The detector can detect, and extract values of, the delay period message therefrom and to provide the values to a delay-detection-window (DDW) timer 626 to which the detector is coupled. Upon subsequent detection at the RLP layer of inadequate delivery thereto of one or more data packets, the timer can be caused to time a time period corresponding to the delay period detected by the detector, prior to generation of a RLP-layer request for retransmission of the data packet(s) (e.g., NAK RLP control frame). Upon expiration of the time period timed by the DDW timer, if the data packet(s) are not adequately delivered to the MS, the RLP-layer request for retransmission can be generated. It should be noted that the MS may use several techniques to determine if the BS 30 has given up or missed the delivery of the missing data packet(s). For example, the MS may detect that, after retransmitting an old packet several times unsuccessfully, the BS kicks off sending a new packet with a new sequence number. Hence, the MS can assume the old packet is given up and missed. If the MS determines that the BS has given up or missed the delivery of the missing RLP data packet, the MS may generate the request for the retransmission prior to the expiration of the DDW timer.

The physical layer can utilize a lower-level, such as an H-ARQ, retransmission scheme. During the delay timed by the timer 626, the H-ARQ retransmission procedures can be selectively performed to cause retransmission of the data packet at the physical layer. The H-ARQ elements formed at the transceiver circuitry 614 are representative of such H-ARQ retransmission functions.

FIG. 7 is a control flow diagram, shown generally at 700, representative of signaling generated during operation of the apparatuses 602, 610 that form a portion of the communication system shown in FIGS. 2 and 6, with the operation being in the context of multiple layer retransmission schemes. As shown, the BS 30 and the MS 10 are separated into logical-layer parts. That is, as shown, the BS is designated by 30-RLP and 30-PHY to designate the RLP and physical layers, respectively. And analogously, the MS is designated by the physical layer 10-PHY and the RLP layer 10-RLP, respectively.

First, and as indicated by block 702, packet data service initialization procedures pursuant to formation of a 1xEV-DV communication session, for example, are performed. Then, and as indicated by the block 704, an estimator 616 positioned at the BS 30 estimates values of an RLP-delay responsive to H-ARQ values or other communication indicia, for example. And as indicated by the segment 706, the delay period message, such as an RLP BLOB including an RLP-delay (min, max, suggested) values is sent to the MS 10. The contents of the message are provided to the RLP layer 10-RLP of the MS. And subsequently, as indicated by the segments 708, 1xEV-DV packet data, utilizing an H-ARQ retransmission scheme, is broadcast from the BS to the MS, shown as being delivered to the RLP-layer 10-RLP thereof.

Then, as shown at block 710, a determination is made whether an RLP frame has or has not been successfully delivered to the RLP layer of the MS 10. Rather than immediately generating a retransmission request from the RLP layer (e.g., a NAK RLP control frame), the DDW timer 626 (shown in FIG. 6) is instead started. The timer times for the delay time period indicated in the RLP BLOB earlier transmitted to the MS, which, as shown, extends for a time period corresponding to the length of the arrow 712.

During the period that the RLP-layer timer is timing the delay period, physical layer H-ARQ retransmissions can be effectuated. And as shown, indicated by the segment 714, a retransmission of an undelivered frame is effectuated. Upon expiration of the timer, if the data packet is not adequately delivered to the RLP layer, the RLP retransmission request (e.g., NAK RLP control frame) is generated. As shown, the retransmission request is indicated by the segment 716 that is communicated from the RLP layer 10-RLP of the MS 10 to the RLP layer 30-RLP of the BS. Subsequently, the data packet is retransmitted, as indicated by the segment 718.

FIG. 8 illustrates a method, shown generally at 800, of requesting data retransmission in accordance with one exemplary embodiment of the present invention. The method facilitates efficient usage of radio capacity in a radio communication system that utilizes retransmission schemes at two or more logical layers by which the elements of the communication system are defined.

First, and as indicated by block 802, indicia associated with communication characteristics in the communication system is detected, generated or otherwise provided. Then, and as indicated by the block 804, a selected second-layer (e.g., RLP layer) delay period by which to delay generation, at a second communication station (e.g., MS 10), of a second-layer resend request (e.g., NAK RLP control frame) requesting resending of the packet-formatted data is estimated. The estimate is formed responsive to the indicia detected during the detecting operation.

Thereafter, and as indicated by the block 806, a delay period message is generated. The delay period message includes a value of the selected second-layer delay period. And as indicated by the block 808, the delay period message is delivered to the second communication station (e.g., MS 10). And thereafter, indicated by the block 810, a time period is timed when the second communication station fails to receive expected packet-formatted data. The time period is indicated by the value contained in the delay period message such that, when the packet-formatted data fails to be adequately delivered to the second logical layer of the second communication station, the second communication station requests resending of the failed (or missing) packet-formatted data, indicated by the block 812. Because of the use of a delay period to delay the generation of the second logical-layer retransmission request (e.g., NAK RLP control frame), the possibility that redundant requests, generated at both the physical layer and at the higher logical-layer is reduced.

As indicated above, RLP frames can be carried by or otherwise transmitted over a plurality of subchannels (or subcarriers). For a number of different reasons, including the fact that the instantaneous load of different subchannels may vary over time, the MS 10 may receive data packets over a number of subchannels on the forward link in an order different from that in which the BS 30 transmitted those data packets. And in a number of conventional systems, in instances in which the MS receives multiple packets (of a sequence of packets) from one channel without receiving one or more intervening packets from another, more congested, channel, the MS may mistakenly determine that the intervening packet(s) were missed, and request retransmission of those packet(s) before their delivery over the congested channel.

More particularly, for example, as shown in FIG. 9, in a scenario of unbalanced subchannels, a sequence of RLP data packets or frames (RLP SEQ) is divided into a plurality of sequences (link sequences) of alternating sets of one or more data packets or frames to be transmitted over a plurality of subchannels (LINK SEQ). In this regard, a first link sequence of data packets (e.g., octets) 900, 904, 908 and 912 can be transmitted over a first subchannel (e.g., subchannel 0), while a second link sequence of data packets (e.g., octets) 902, 906, 910 and 914 can be transmitted over a second subchannel (e.g., subchannel 1). Because of carrier loading differences and other possible reasons, the MS 10 may receive the data packets in the order 900, 902, 906, 910 and 914, while the remaining data packets 904, 908 and 912 are in transit over their respective subchannels ("on the fly"). Conventionally, in such an instance, the MS may detect a missing plurality of data packets (a "hole") when the MS determines that the plurality of data packets 904 is missing. And in response to detecting the missing plurality of data packets 904, the MS may unnecessarily send a request for retransmission of the respective plurality of data packets, although the plurality of data packets may not be missing but delayed in reaching the MS.

In view of multi-channel or carrier scenarios such as that provided above, in addition to or in lieu of dynamically configuring parameters of the RLP layer, and/or selectively delaying retransmission requests at the RLP layer to provide more time to carry out a lower-layer retransmission scheme, the MS 10 may selectively delay RLP or other retransmission requests at the RLP layer to provide more time for delayed RLP data packets to be received at the MS. Thus, continuing the scenario of FIG. 9, when the MS detects missing data packets in a particular link sequence (e.g., detecting missing sequence 904 upon receiving subchannel 0 sequences 900 and 908), the MS may immediately request retransmission of the missing data packets. On the other hand, presume that the MS receives the link sequences in order such that any detected hole is not caused by a link erasure (e.g., receiving subchannel 0 sequences 902, 906, 910 and 912 in order, and subchannel 0 sequences in order—sequence 900 being the only received sequence in FIG. 9). In such an instance, the MS may delay requesting retransmission of the plurality of data packets 904, and instead cause the timer 626 to time a time period prior to generation of a request for retransmission of the data packets (e.g., NAK RLP control frame). Upon expiration of the time period timed by the timer, if the data packets 904 are not adequately delivered to the MS, the request for retransmission can be generated and sent to the BS to thereby cause the BS 30 to retransmit the respective data packets. Similar to the delay time in the context of multiple layer retransmission schemes, the delay time in the context of multi-carrier transmission can comprise a selectable value, selected responsive to indicia associated with communications in the communication system.

FIG. 10 is a control flow diagram, shown generally at 1000, representative of signaling generated during operation of the apparatuses 602, 610 that forms a portion of the communication system, shown in FIGS. 2 and 6, operation being in the context of multi-carrier transmission. As indicated by block 1002, packet data service initialization procedures pursuant to formation of a NxDO communication session, for example, are performed. Then, and as indicated by the block 1004, an estimator 616 positioned at the BS 30 estimates values of an RLP-delay responsive to communication indicia, for example. And as indicated at 1006, the delay period message, such as an RLP BLOB including an RLP-delay (min, max, suggested) values is sent to the MS 10. And subsequently, as indicated by the segments 1008, NxDO packet data is broadcast from the BS to the MS. As the NxDO packet data is broadcast, the MS can maintain two S-bit variables, V(R) and V(N), to indicate the RLP sequence of the expected next new data packet (e.g., octet) and the RLP sequence of the first missing data packet. Similarly, for each subchannel i over which the RLP data packets are transmitted, the MS can also maintain two S-bit variables, $V_i(R)$ and $V_i(N)$, to indicate the link sequence of the expected next new data packet (e.g., octet) and the first missing data packet, respectively.

Then, as shown at block 1010, a determination is made whether expected data packets or frames have or have not been successfully delivered to the MS 10 based upon the RLP sequence and the link sequences, such as based upon V(R) and V(N), and $V_i(R)$ and $V_i(N)$, respectively. If expected data packets or frames in a link sequence have not been successfully delivered to the MS (missing data packets detected based upon a link sequence), the MS can immediately generate a retransmission request (e.g., a NAK RLP control frame) for transmission to the BS to thereby cause the BS to retransmit or resend the respective data packets or frames. If, on the other hand, expected data packets or frames in a link sequence have been successfully delivered, but those in the RLP sequence have not been successfully delivered to the MS (missing data packets detected based upon the RLP—or overall—sequence), rather than immediately generating a retransmission request, the DDW timer 626 (shown in FIG. 6) is instead started. The timer times for the delay time period indicated in the RLP BLOB earlier transmitted to the MS, which, as shown, extends for a time period corresponding to the length of the arrow 1012.

As shown at 1014, during the period that the timer 626 is timing the delay period, the data packets or frames in the RLP sequence, previously detected as not having been successfully delivered to the MS, may be delivered to the MS, those data packets or frames possibly having been delayed due to transmission over a congested subchannel. Upon expiration of the timer, if the otherwise missing data packet or frame is not adequately delivered to the MS, the RLP retransmission request (e.g., NAK RLP control frame) is generated. As shown, the retransmission request is indicated by the segment 1016 that is communicated from the MS 10 to the BS 30. After receiving the retransmission request, the BS can determine if the retransmission request was triggered by missing data packets or frames in a link sequence or the RLP sequence. If the retransmission request was triggered by missing data packets in a link sequence, it can be resolved by the BS as it is today. In such instances, the BS may selectively retransmit the missing data packet over any assigned forward link subchannel, such as a less congested subchannel. If, on the other hand, the retransmission request is triggered by missing data packets or frames in the RLP sequence, the BS can implement a load balancing mechanism as new data packets are retransmitted over less congested subchannels. Additionally or alternatively, the BS can retransmit the missing data packet to the MS, as indicated by the segment 1018.

FIG. 11 illustrates a method, shown generally at 1100, of requesting data retransmission in accordance with another exemplary embodiment of the present invention. The method facilitates efficient usage of radio capacity in a radio communication system that utilizes multi-carrier transmission.

First, and as indicated by block 1102, indicia associated with communication characteristics in the communication system is detected, generated or otherwise provided. Then, and as indicated by the block 1104, a selected delay period by which to delay generation, at a second communication station (e.g., MS 10), of a resend or retransmission request (e.g., NAK RLP control frame) requesting resending or retransmission of the packet-formatted data is estimated. In this regard, an overall sequence of packet-formatted data is divided into a plurality of link sequences of portions of the overall packet-formatted data, the link sequences to be received by the second communication station over respective subchannels. The estimate is formed responsive to the indicia detected during the detecting operation.

Thereafter, and as indicated by the block 1106, a delay period message is generated. The delay period message includes a value of the selected delay period. As indicated by the block 1108, the delay period message is delivered to the second communication station (e.g., MS 10). And thereafter, indicated by the block 1110, a time period is timed when the second communication station detects missing packet-formatted data based upon the overall sequence, the time period being indicated by the value contained in the delay period message. If the second communication station fails to receive the detected missing packet-formatted data as the time period is timed, the second communication station thereafter requests resending or retransmission of the failed (or missing) packet-formatted data. Alternatively, when the second communication station detects missing packet-formatted data based upon a link sequence, the second communication station requests resending or retransmission of the failed packet-formatted data without first timing the time period. In either event, a first communication station (e.g., BS 30) determines if the resend or retransmission request was triggered by failed delivery of the packet-formatted data in the overall sequence or in a link sequence, as indicated by the block 1112. If the data is missing in a link sequence (i.e., request triggered by failed delivery of packet-formatted data in a link sequence), the first communication station retransmits the missing packet-formatted data, as indicated by the block 1114. If, on the other hand, the retransmission request was triggered by failed delivery of the packet-formatted data in the link sequence, (i.e., request triggered by failed delivery of packet-formatted data in the overall sequence), the first communication station transmits new or future packet-formatted data over less congested subchannels, and retransmits the missing-packet formatted data, as indicated by the blocks 1116 and 1118.

As explained above with reference to FIGS. 5-11, an apparatus 602 of the BS 30 can include an estimator 616 for receiving communication indicia and forming or estimating delay period values, a delay period message generator 618 for generating a message for communication to the MS 10 to report on the formed or estimated values. It should be understood, however, that the apparatus 602 need not be located at the BS, but may instead be located at another entity directly or indirectly coupled to the MS. In another alternative, the apparatus 602 may be co-located with, or otherwise local to, the MS, where the apparatus in such an instance may function without a message generator. And in yet other instances, the estimator may be preprogrammed with delay period values (e.g., 300-milliseconds), in addition to or in lieu of estimating such values based upon received communication indicia. Such preprogrammed delay values, then, may comprise the periods that a subsequent request for retransmission of one or more data packets at the RLP layer (e.g., NAK RLP control frame) should be delayed.

According to one exemplary aspect of the present invention, the functions performed by one or more of the entities of the system, such as the MS 10 and/or BS 30, respectively, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIGS. 4, 8 and 11 are flowcharts, and FIGS. 7 and 10 are control flow diagrams, of methods, systems and program products according to the exemplary embodiments of the present invention. It will be understood that each block or step of the flowcharts and control flow diagrams, and combinations of blocs or steps in the flowcharts and control flow diagrams, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the block(s) or step(s) of the flowcharts and control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts and control flow diagrams. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts and control flow diagrams.

Accordingly, blocks or steps of the flowcharts and control flow diagrams support combinations of means for performing the specified functions, combinations of steps for performing the specified functions and program instruction means for performing the specified functions. It will also be understood that one or more blocks or steps of the flowcharts and control flow diagrams, and combinations of blocks or steps in the flowcharts and control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus configured to receive packet-formatted data in a plurality of instances, the packet-formatted data in each instance having an overall sequence and including a plurality of portions each of which has a respective link sequence, the apparatus comprising:

a processor; and a memory including computer program code, the memory and computer program code configured to, with the processor, cause the apparatus in at least one of the plurality of instances to at least:

receive portions of the packet-formatted data over respective subchannels of a radio communication system;

detect that a portion of the packet-formatted data is missing based upon the overall sequence;

time a time period; and generate a request for retransmission of the missing portion of the packet-formatted data when the apparatus fails to receive the missing portion of the packet-formatted data before the time period times out.

2. An apparatus according to claim 1, wherein the memory and computer program code are configured to, with the processor, cause the apparatus in at least one of the plurality of instances to at least:
  detect that a part of a portion of the packet-formatted data is missing based upon the link sequence of the respective portion; and
  generate a request for retransmission of at least the missing part of the portion without timing the time period.

3. An apparatus according to claim 1, wherein being configured to cause the apparatus to generate a request includes being configured to cause the apparatus to generate, and thereafter transmit, a request for retransmission such that the missing portion of the packet-formatted data is retransmitted over a selected subchannel, the subchannel being selected based upon congestion of at least some of the subchannels.

4. An apparatus according to claim 1, wherein data, and the memory and computer program code are configured to, with the processor, cause the apparatus in the at least one of the plurality of instances to further:
  estimate or receive an estimation of a selected delay period by which to delay generation of the request, the time period corresponding to selected delay period.

5. An apparatus according to claim 4, wherein being configured to cause the apparatus to estimate or receive an estimation of a selected delay period includes being configured to cause the apparatus to estimate or receive an estimation of a range of delay period times, the range of the delay periods bounded by a minimum delay period and a maximum delay period.

6. An apparatus according to claim 5, wherein being configured to cause the apparatus to estimate or receive an estimation of a selected delay period includes being configured to cause the apparatus to estimate or receive an estimation of a practical delay period time, the practical delay period time comprising a delay period between the minimum delay period time and the maximum delay period time.

7. A first apparatus comprising:
  a processor; and
  a memory including computer program code, the memory and computer program code configured to, with the processor, cause the first apparatus in at least one of a plurality of instances to at least:
  receive a request for retransmission of a missing portion of packet-formatted data from a second apparatus configured to receive packet-formatted data in the plurality of instances, the packet-formatted data in each instance having an overall sequence and including a plurality of portions each of which has a respective link sequence, wherein in the respective at least one of the plurality of instances, the second apparatus is configured to:
    receive portions of the packet-formatted data over respective subchannels of a radio communication system;
    detect that a portion of the packet-formatted data is missing based upon the overall sequence;
    time a time period; and
    generate the request for retransmission when the second apparatus fails to receive the missing portion of the packet-formatted data before the time period times out; and
  retransmit the missing portion of the packet-formatted data to the second apparatus in response to the request for retransmission.

8. A first apparatus according to claim 7, wherein the memory and computer program code are configured to, with the processor, cause the first apparatus in at least one of the plurality of instances to at least:
  receive a request for retransmission of at least a missing part of a portion of the packet-formatted data from the same or another second apparatus, wherein in the respective at least one of the plurality of instances, the same or other second apparatus is configured to:
    receive portions of the packet-formatted data over respective subchannels of the radio communication system;
    detect that a part of a portion of the packet-formatted data is missing based upon the link sequence of the respective portion; and
    generate the request for retransmission of at least the missing part without the same or other second apparatus timing the time period; and
  retransmit at least the missing part of the portion of the packet-formatted data to the same or other second apparatus in response to the respective request for retransmission.

9. A first apparatus according to claim 7, wherein being configured to cause the first apparatus to retransmit the missing portion of the packet-formatted data includes being configured to cause the first apparatus to:
  select a subchannel based upon congestion of at least some of the subchannels; and
  retransmit the missing portion of the packet-formatted data over the selected subchannel.

10. A first apparatus according to claim 7, wherein the memory and computer program code are configured to, with the processor, cause the first apparatus in at least one of the plurality of instances to further:
  estimate a selected delay period by which to delay generation of the request for retransmission, the time period corresponding to selected delay period.

11. A first apparatus according to claim 10, wherein being configured to cause the first apparatus to estimate a selected delay period includes being configured to cause the first apparatus to estimate a range of delay period times, the range of the delay periods bounded by a minimum delay period and a maximum delay period.

12. A first apparatus according to claim 11, wherein being configured to cause the first apparatus to estimate a selected delay period includes being configured to cause the first apparatus to estimate a practical delay period time, the practical delay period time comprising a delay period between the minimum delay period time and the maximum delay period time.

13. A method for receiving packet-formatted data at an apparatus configured to receive packet-formatted data in a plurality of instances, the packet-formatted data in each instance having an overall sequence and including a plurality of portions each of which has a respective link sequence, the method comprising in at least one of the plurality of instances:
  receive portions of the packet formatted data over respective subchannels of a radio communication system;
  detecting that a portion of the packet-formatted data is missing based upon the overall sequence or at least one of the link sequences;
  timing a time period; and
  generating a request for retransmission of the missing portion of the packet-formatted data when the apparatus fails to receive the missing portion of the packet-formatted data before the time period times out.

14. A method according to claim 13, wherein in at least one of the plurality of instances the method comprises:

detecting that a part of a portion of the packet-formatted data is missing based upon the link sequence of the respective portion; and generate a request for retransmission of at least the missing part of the portions without timing the time period.

15. A method according to claim 13, wherein generating a request comprises generating, and thereafter transmitting, a request for retransmission such that the missing portion of the packet-formatted data is retransmitted over a selected subchannel, the subchannel being selected based upon congestion of at least some of the subchannels.

16. A method according to claim 13 further comprising in at least one of the instances:

estimating or receiving an estimation of a selected delay period by which to delay generation of the request, the time period corresponding to selected delay period.

17. A method according to claim 16, wherein estimating or receiving an estimation of a selected delay period comprises estimating or receiving an estimation of a range of delay period times, the range of the delay periods bounded by a minimum delay period and a maximum delay period.

18. A method according to claim 17, wherein estimating or receiving an estimation of a selected delay period comprises estimating receiving an estimation of a practical delay period time, the practical delay period time comprising a delay period between the minimum delay period time and the maximum delay period time.

19. A method comprising in at least one of a plurality of instances:

receiving, at a first apparatus, a request for retransmission of a missing portion of packet-formatted data from a second apparatus is configured to receive packet-formatted data in the plurality of instances, packet-formatted data in each instance having an overall sequence and including a plurality of portions each of which has a respective link sequence, wherein in the respective at least one of the plurality of instances, the second apparatus is configured to:

receive portions of the packet-formatted data over respective subchannels of a radio communication system;

detect that a portion of the packet-formatted data is missing based upon the overall sequence;

time a time period; and generate the request for retransmission when the second apparatus fails to receive the missing portion of the packet-formatted data before the time period times out; and retransmitting the missing portion of the packet-formatted data from the first apparatus to the second apparatus in response to the request for retransmission.

20. A method according to claim 19, further comprising in at least one instance:

receiving a request for retransmission of at least a missing part of a portion of the packet-formatted data from the same or another second apparatus, wherein in the respective at least one of the plurality of instances, the same or other second apparatus is configured to:

receive portions of the packet-formatted data over respective subchannels of the radio communication system;

detect that a part of a portion of the packet-formatted data is missing based upon the link sequence of the respective portion; and generate the request for retransmission of at least the missing part without the same or other second apparatus timing the time period; and retransmitting at least the missing part of the portion of the packet-formatted data from the first apparatus to the same or other second apparatus in response to the respective request for retransmission.

21. A method according to claim 19, wherein retransmitting the missing portion of the packet formatted data comprises:

selecting a subchannel based upon congestion of at least some of the subchannels; and retransmitting the missing portion of the packet-formatted data over the selected subchannel.

22. A method according to claim 19 further comprising:

estimating a selected delay period by which to delay generation of the request for retransmission, the time period corresponding to selected delay period.

23. A method according to claim 22, wherein estimating a selected delay period comprises estimating a range of delay period times, the range of the delay periods bounded by a minimum delay period and a maximum delay period.

24. A method according to claim 23, wherein estimating a selected delay period comprises estimating a practical delay period time, the practical delay period time comprising a delay period between the minimum delay period time and the maximum delay period time.

* * * * *

UNITED STATES PATENT AND TRADEMARK OFFICE
CERTIFICATE OF CORRECTION

| | |
|---|---|
| PATENT NO. | : 7,936,664 B2 |
| APPLICATION NO. | : 11/400838 |
| DATED | : May 3, 2011 |
| INVENTOR(S) | : Zhu et al. |

It is certified that error appears in the above-identified patent and that said Letters Patent is hereby corrected as shown below:

Column 19
Line 18, cancel "data, and".

Column 21
Line 5, "portions" should read --portion--.

Signed and Sealed this
Twenty-sixth Day of March, 2013

Teresa Stanek Rea
*Acting Director of the United States Patent and Trademark Office*